United States Patent [19]

Gerber

[11] Patent Number: 5,262,495
[45] Date of Patent: Nov. 16, 1993

[54] RETARDERS FOR CURING PHENOLIC RESOLE RESINS CONTAINING AN AGGREGATE MATERIAL

[75] Inventor: Arthur H. Gerber, Louisville, Ky.

[73] Assignee: Borden, Inc., Columbus, Ohio

[21] Appl. No.: 11,168

[22] Filed: Feb. 1, 1993

Related U.S. Application Data

[62] Division of Ser. No. 892,280, Jun. 2, 1992, Pat. No. 5,214,111, which is a division of Ser. No. 804,218, Dec. 9, 1991, Pat. No. 5,145,913, which is a division of Ser. No. 562,206, Aug. 2, 1990, Pat. No. 5,096,983.

[51] Int. Cl.$^5$ .................. C08F 283/00; C08G 8/28
[52] U.S. Cl. ..................... 525/506; 525/508; 528/129
[58] Field of Search ............. 525/506, 508; 528/129

[56] References Cited

U.S. PATENT DOCUMENTS

| | | | |
|---|---|---|---|
| 1,580,424 | 4/1926 | Ellis | 528/129 |
| 2,424,787 | 7/1947 | Adams, Jr. | 524/454 |
| 2,712,533 | 7/1955 | Mitchell | 524/270 |
| 2,869,191 | 1/1959 | Cooper et al. | 22/147 |
| 2,869,194 | 1/1959 | Cooper | 22/193 |
| 2,869,196 | 1/1959 | Cooper | 22/193 |
| 2,913,787 | 11/1959 | Cooper | 22/193 |
| 3,624,247 | 11/1971 | Gladna et al. | 524/594 |
| 3,666,703 | 5/1972 | Timareta et al. | 523/145 |
| 4,011,186 | 3/1977 | Higginbottom | 523/145 |
| 4,216,295 | 8/1980 | Dahms | 521/112 |
| 4,282,288 | 8/1981 | Yoshino et al. | 428/408 |
| 4,283,319 | 8/1981 | Konii et al. | 523/145 |
| 4,473,654 | 9/1984 | Stendera | 501/108 |
| 4,495,316 | 1/1985 | Armbruster | 523/239 |
| 4,539,343 | 9/1985 | Nishimara | 523/145 |
| 4,740,535 | 4/1988 | Eyer et al. | 523/145 |
| 4,794,051 | 12/1988 | Gupta | 428/524 |
| 4,831,067 | 5/1989 | Lemon et al. | 523/156 |
| 4,939,188 | 7/1990 | Gerber | 523/146 |
| 4,950,433 | 8/1990 | Chim | 264/13 |
| 4,961,795 | 10/1990 | Detlefsen et al. | 156/62.2 |

FOREIGN PATENT DOCUMENTS 0094165 11/1983 European Pat. Off. .
6090251 5/1985 Japan .

*Primary Examiner*—John Kight, III
*Assistant Examiner*—Terressa M. Moseley
*Attorney, Agent, or Firm*—George P. Maskas; Kenneth P. Van Wyck; Dennis H. Rainear

[57] ABSTRACT

There are disclosed methods and compositions for retarding the room temperature gelation and eventual hardening of phenolic resole resins when such resins are mixed with lightburned magnesium oxide or magnesium hydroxide hardening agents with or without an ester functional hardening agent. Retardation of gelation and hardening is achieved by incorporating into said mixture a compound which decreases the solubility of magnesium in said mixture. Additionally, hardening at higher temperatures, thermal curing, as well as refractories, coated abrasives, polymer concrete, and other methods and compositions of this invention are disclosed.

25 Claims, No Drawings

RETARDERS FOR CURING PHENOLIC RESOLE RESINS CONTAINING AN AGGREGATE MATERIAL

This is a divisional of copending application Ser. No. 07/892,280 filed on Jun. 2, 1992 now U.S. Pat. No. 5,214,111 which in turn is a divisional of Ser. No. 07/804,218 filed Dec. 9, 1991, now U.S. Pat. No. 5,145,913, which in turn is a divisional of Ser. No. 07/562,206 filed on Aug. 2, 1990, now U.S. Pat. No. 5,096,983.

BACKGROUND OF THE INVENTION

This invention relates to methods and compositions for retarding the hardening of phenolic resole resin binder compositions which are hardened with magnesium oxide or magnesium hydroxide alone or together with an ester functional hardening agent. Such hardening can take place at about room temperature.

It is desirable to be able to easily control the rate of phenolic resole resin hardening, such as by being able to retard the hardening and maintain flowability, trowelibility, and other working properties of the phenolic resin composition. This is particularly the case in warm climates and at higher temperatures.

Applicant has found that hardening of phenolic resole resins admixed with hardening quantities of lightburned magnesium oxide or magnesium hydroxide, either alone or together with an ester functional hardening agent can be retarded by use of materials which decrease the solubility of magnesium ions in the mixture.

Phenolic resole resins can be room temperature hardened by several means, such as: (1) contact with a strong acid; (2) contact with an ester functional hardening agent, particularly when the phenolic resole resin is highly alkaline; (3) contact with alkaline earth oxides or hydroxides such as calcium or magnesium oxides or hydroxides; (4) gassing of certain phenolics with chemicals such as amines; and (5) hardening with both a magnesium oxide or hydroxide hardening agent and an ester functional hardening agent. Use of strong acids is unsatisfactory because a basic filler is generally used in binder compositions and this causes the acid to be neutralized and become ineffective. Furthermore, strong acids can be corrosive. The amine and other gasing agents are generally toxic. Use of ester functional curing agents at a high pH (greater than about 12), which often serve as binders for foundry applications such as shaped foundry cores and molds, present problems because of the high alkalinity and alkali metal content such as that of sodium or potassium. The high pH causes concern for handling and final disposal to the environment. The high potassium or sodium concentrations are undesirable for certain uses such as that in polymer concrete or thermal bonding of glass or polyester fibers since high concentrations of alkali metals at a high pH lead to attack of such materials.

Lightburned magnesium oxide and magnesium hydroxide are well known room temperature (R.T.) hardening agents for phenolic resole resins. Furthermore, magnesium oxide and magnesium hydroxide are often used as the condensation catalysts for the manufacture of phenol formaldehyde resole resins from phenol and formaldehyde. Additionally, relatively inactive magnesia, e.g., periclase, is a conventional refractory aggregate which is often bound into various shapes with phenolic resins; Illustrative of references which disclose the use of magnesium oxide or magnesium hydroxide to harden phenolic resole resins in various types of compositions, there can be mentioned U.S. Pat. Nos. 2,869,194 of Jan. 20, 1959 to R. H. Cooper; 2,86,196 of Jan. 20, 1959 to R. H. Cooper; 2,913,787 of Nov. 24, 1959 to R. H. Cooper; 3,666,703 of May 30, 1972 to T. Murata et al; 2,712,533 of Jul. 5, 1955 to J. S. Mitchell; 2,424,787 of Jul. 29, 1947 to W. H. Adams, Jr.; and 4,794,051 of Dec. 27, 1988 to M. K. Gupta. The U.S. Pat. No. 4,794,051 Gupta patent also mentions the use of a class of ester functional hardening agents namely, lactones, which are used together with the magnesium hardeners, but preferably in admixture with calcium hardener. The U.S. Pat. No. 2,869,194 Cooper patent also mentions that magnesium oxychloride and magnesium oxysulfate, which can be prepared by mixing magnesium oxide powder with an aqueous solution of magnesium chloride or its equivalent or magnesium sulfate or its equivalent, frequently provide shorter hardening times as compared to the magnesium oxide alone.

U.S. patent application Ser. No. 450,989 entitled "Phenolic Resin Compositions" filed Dec. 15, 1989 with P. H. R. B. Lemon, J. King, H. Leoni, G. Murray, and A. H. Gerber as Inventors, now U.S. Pat. No. 5,051,454 which issued on Sep. 24, 1991, and which is based on GB 8829984.7 filed Dec. 22, 1988, discloses the preparation of phenolic resole resins with alkali or alkaline earth metal compounds as the basic catalyst and the subsequent room temperature hardening of such resins with an esterified phenolic resole as the ester functional hardening agent together with various bases, including oxides and hydroxides of magnesium and calcium.

European Patent Application Publication Number 0094165, which was published on Nov. 16, 1983 with P. H. R. B. Lemon et al as inventors, has broad recitations which mention the use of various alkaline materials including magnesium oxide (magnesia) for condensing phenol and formaldehyde to form phenol-formaldehyde resins and for further increasing the alkalinity of such resins which use ester functional agents for hardening the phenolic resin. European Patent Application Publication No. 0243,172, which was published on Oct. 28, 1987 and lists P. H. R. B. Lemon et al as inventors now U.S. Pat. No. 4,831,067 which issued on Jun. 16, 1989, has recitations similar to those of the above-mentioned 0094165 publication.

U.S. patent application Ser. No. 288,090, which was filed on Dec. 22, 1988, now U.S. Pat. No. 4,939,188 which issued on Jul. 3, 1990, with A. H. Gerber as inventor, discloses the use of lithium ion generating alkalizing agents in resole resin binder compositions which, when hardened by an ester functional hardening agent, exhibit tensile and compressive strengths superior to that obtained from compositions using sodium or potassium ion generating alkalizing agents.

U.S. Pat. No. 4,011,186 of Mar. 8, 1977 to Higgenbottom as well as U.S. Pat. No. 4,216,295 of Aug. 5, 1980 to Dahms relate to phenolic resoles catalyzed with alkaline earth metal hydroxides and neutralized with oxalic acid or its acid salts which provide stable, inert, insoluble oxalate salts dispersed in said resole and, additionally increases the viscosity of the resole resin.

U.S. Pat. No. 3,624,247 of Nov. 30, 1971 to Gladney et al relates to the removal of residual calcium catalyst used in the production of phenolic resins. The residual calcium catalyst is removed by treatment with an alkaline solution of an ammonium salt which forms an insoluble salt with calcium upon pH adjustment. Soluble ammonium compounds used in the process of the 247 patent are listed as sulfate, phosphate, and carbonate.

U.S. Pat. No. Re. 32,720 of Jul. 26, 1988 and U.S. Pat.No. Re. 32,812 of Dec. 27, 1988 to P. H. R. B. Lemon et al are further illustrative of the literature which discloses room temperature hardening of highly alkaline phenol-formaldehyde resole resins with an ester curing agent. U.S. Pat. application Ser. No. 149,102 which was filed on Jan. 27, 1988 to Detlefsen et al shows the use now U.S. Pat. No. 4,961,795 which issued on Oct. 9, 1990. of aliphatic alcohols to moderate or retard the hardening of phenolic resole resins with ester functional hardening (curing) agents.

SUMMARY OF THE INVENTION

It has now been found that the room temperature hardening of a phenolic resole resin admixed with a magnesium hardening agent such as magnesium oxide or magnesium hydroxide, either alone or together with an ester functional hardening agent, can be retarded with materials which decrease the solubility of magnesium in the mixture.

In one aspect of the invention, binder compositions and methods for preparing binder compositions having an extended work life are provided by mixing the hardenable phenolic resole resin with a magnesium hardening agent alone or together with an ester functional hardening agent and a retarder and optionally a calcium containing hardening agent such as calcium oxide, calcium hydroxide, and calcined dolomite. The binder compositions are liquids or at least flowable at room temperature. Further, such methods and compositions can involve both a room temperature and a thermal cure. Mixing the flowable binder composition with an aggregate produces a raw batch composition.

In another aspect of the invention, the retarder used in compositions and methods of this invention is a material which further cross-links the phenolic resin upon thermal curing. Such materials include melamine or amino acids.

In another aspect of this invention, methods and compositions are provided wherein a retarder is mixed with a phenolic resole resin, a magnesium hardening agent, with or without an ester functional hardening agent, in order to increase the working time before substantial viscosity increase of resin occurs and the mixture is then thermally cured.

Other aspects of this invention involve a hardenable phenolic resole resin, a magnesium hardening agent, alone or together with an ester functional hardening agent and a retarder and optionally aggregate, fillers, and other additives or modifiers wherein the magnesium hardening agent is a mixture of magnesium oxides having a high and a low surface area.

Other aspects of the invention include compositions and methods of this invention involving various fillers, aggregates, shaped articles as well as binders having low sodium and potassium contents.

Other aspects of this invention include the preparation of shaped refractory articles. In the case of monolithic refractories, a liquid slurry of a binder-aggregate composition of this invention with extended work life is placed in a vibrating mold and the composition is permitted to harden in the mold. Such ambient temperature hardening can optionally be followed with thermal cure.

Additional aspects of the invention provide for polymeric concrete compositions which have extended trowelability and the use of compositions and methods of this invention for making coated abrasives as well as coated abrasives made by such methods.

ADVANTAGES

The processes and compositions of this invention provide a means for retarding the rate of hardening of phenolic resole resins over a wide temperature range such as about 60° F. to 120° F. by use of small amounts of various chemicals which decrease the solubility of magnesium in the binder and retard the hardening of the resin. One of the variables affecting the rate of hardening of phenolic resole resins is temperature. Higher temperatures increase the rate of hardening. Therefore, by use of the retarders of this invention, the hardening rate can be retarded over a wide range of temperatures such as room or ambient temperatures, particularly in warmer climates or work places which attain higher temperatures. Such retardation provides for decreased viscosity build up over time and an increased working life for the resin.

The methods and compositions of this invention can also affect reaction rate of the phenolic resole resin by selection of surface area of the magnesia to be used, by choice of the specific retarder, and, optionally, by choice of the specific ester as well as the quantities of the hardeners and retarder.

Several applications where increased flow, i.e., decreased viscosity over time, and increased working life of phenolic resole resins are particularly advantageous include:

(a) formulations for coated abrasive applications where room temperature stability of formulated resin is desirable for decreasing scrap of formulated resin and development of a good bond between the resin, abrasive, and backing prior to a thermal cure;

(b) polymer concrete where increased flow leads to improved compaction and the filling of molds, etc. and surface finishing such as troweling;

(c) manufacture of refractory bricks where significant extension of mix life, e.g., at least 48 hours, is obtained for pressing of the refractory bricks prior to thermal or oven curing; and (d) increased flow for castable refractory applications. This increased flow provides higher density and higher strength for the room temperature hardening in preparation for thermal curing and optionally carbonization after the thermal cure. This is particularly the case for larger shapes which require more time for preparation.

Preferred methods and compositions of this invention utilize an ester functional hardening agent together with the magnesium hardening agent since the reaction rate of phenolic compositions are strongly affected when an ester is used with the lightburned magnesia or magnesium hydroxide hardener together with a retarder. Furthermore, the hardened phenolic resoles, which use both a magnesium hardening agent and an ester functional hardening agent, have greater compressive and tensile strength as well as greater resistance to aqueous organic acids as compared to phenolic resoles which have been hardened only with the magnesium oxide or magnesium hydroxide.

Another advantage of the retarders of this invention is that although the hardening of the resin is retarded, the resin eventually hardens or cures to about the same or greater compressive and tensile strength as compared to resins which did not contain a retarder. Furthermore, other properties of the final compositions are not adversely affected.

The methods and compositions of this invention possess many advantages as compared to curing of phenolic resole resins with esters alone as shown in U.S. Pat. No. Re. 32,720 of Jul. 26, 1988 to Lemon et al and U.S. Pat. No. Re. 32,812 of Dec. 27, 1988 to Lemon et al. The processes and resins of those patents require alkali metal hydroxides and for practical applications have a pH of greater than 12. In contrast to those patents, the present invention involves substantially lower pH values, and there is no need for alkali metal hydroxides or salts. The compositions and methods of the present invention have many advantages over those which do require high alkalinity, e.g., pH of 10 or 12 or more, particulary in view of the high alkali metal concentration required for the highly alkaline compositions. Illustratively, the compositions of the present invention have: Better shelf stability; improved stability of resin color in relation to time and exposure to the atmosphere; lower viscosities at equal phenolic solids levels which, among other things, increases wettability of aggregate or substrate which, in turn, increases bond strength; safer material and waste handling properties; a higher density and less porosity on curing at the higher solids levels for resin, compositions, e.g., such as those containing aggregate which, in turn, increases strength and resistance to solvents and aqueous media; and improved stability with aggregates normally attacked by sodium or potassium at a high pH and improved stability with glass or polyester fiber. Excess alkali can result in strength loss, e.g., see Lemon et al. U.S. Pat. No. Re. 32,812, Table 4, wherein the effect of KOH/phenol molar ratio shows steady decrease in compressive strength of resoles as the mole ratio is increased from 0.68 (5032 psi) to 1.02 (4271 psi). In contrast to this, an excess of the magnesium hardener can increase strength and also insolubility of the final composite because of the divalent cross linking by magnesium in comparison with chain termination by use of sodium or potassium alkalies.

DETAILED DESCRIPTION OF THE INVENTION

Magnesium Oxide and Magnesium Hydroxide Hardening Agents

The term "retarder" as used herein refers to a material which decreases the solubility of magnesium in the methods and compositions of this invention such as the hardenable binders which contain the phenolic resole resin, a magnesium hardener, and optionally an ester functional hardening agent. Decreasing the solubility of the magnesium hardener slows or delays the hardening of the resin.

The term "hardening agent" is used herein to denote a material which increases the rate of hardening of a phenolic resole resin, e.g., at room or ambient temperature (R.T.). Hardening is attained with increases in viscosity and gelation to form a solid which is firm to the touch and generally inflexible. The hardenable binder compositions of this invention which contain a phenolic resole resin, magnesium hardener and optionally an ester functional hardening agent but without a retarder will generally be hard within about 24 hours of standing at 75° F. Although such hardening can also be referred to as "curing," the "hardening" or "curing" with hardening agents does not develop the tensile and compressive strengths of a thermal cure.

By the term "room temperature hardening" we mean the hardening of compositions of this invention at temperatures of about 60° F. to 90° F., particularly about 65° F. to 80° F. However, the use of retarders in the processes and compositions of this invention retard the hardening of compositions of this invention at lower and higher temperatures such as 60° F. to 120° F. In addition to room temperature hardening, or hardening at ambient temperatures such as those of about 60° F. to 120° F., the compositions of this invention can be thermally cured after hardening by the hardening agents or the compositions can be thermally cured prior to such hardening. The term "thermal curing" as used herein means curing of the composition at a temperature of at least 170° F. and generaly at a temperature of at least 212° F.

The magnesium hardening agents are magnesium hydroxide, lightburned magnesium oxide, or other magnesium oxide which has the hardening activity for phenolic resole resins of lightburned magnesium oxide such as that having a surface area of at least 10 square meters per gram (10 m$^2$/g). Lightburned magnesium oxide is the preferred magnesium hardening agent because magnesium hydroxide gives lower strengths to the hardened compositions.

Small quantities of calcium hydroxide, calcium oxide, or calcined dolomite (doloma) can also be added as a hardening agent. However, the use of calcium oxide, calcined dolomite, or calcium hydroxide alone or in high quantities together with the magnesium hardeners have serious shortcomings. Thus, calcium based oxides, including calcined dolomite, or hydroxides are highly basic and react too quickly, thus greatly reducing the mix working time. However, minor quantities, i.e., less than 50% by weight based on the weight of the magnesium hardening agent, of these calcium containing compounds, when mixed with the magnesium hardening agents, can be used to replace an equivalent weight of the magnesium hardening agents. Preferably such minor quantities do not exceed about one-fourth of the total weight of the magnesium oxide or magnesium hydroxide hardening agent.

Reactivity and surface area of magnesium oxide (magnesia) differ greatly depending on the procedure used for manufacture of the magnesia. Lightburned grades of magnesium oxide are calcined at temperatures ranging from about 1600° to 1800° F. Hardburned grades are calcined at temperatures ranging from about 2800° to 3000° F. Deadburned or periclase grade of magnesium oxide is calcined at temperatures of over 4000° F. The lightburned grades are generally available in powder or granulated form while hardburned grades are available in kiln run, milled, or screened sizes. Periclase is generally available as briquettes and as screened or milled fractions. There are large differences in surface areas for the various magnesias. Thus, lightburned magnesia has a surface area of about 10 to 200 or more square meters per gram (m$^2$/g). Hardburned magnesia has a surface area of about one square meter per gram, whereas deadburned magnesia has a surface area of less than one square meter per gram. Magnesia which is conventionally used as a refractory aggregate is the deadburned or periclase magnesia. Magnesia products having different surface areas can be obtained from the Martin Marietta Company under the designator of Mag Chem Magnesium Oxide Products. Illustratively, Mag Chem 30 has a surface area of about 25 square meters per gram. Mag Chem 50 has a surface area of about 65 square meters per gram whereas Mag Chem 200D has a surface area of about 170 square meters per gram.

One of the variables for viscosity increase, formation of gel and subsequent hardening of a phenolic resole resin is dependent on the surface areas of the lightburned magnesium oxide. Magnesium oxides, with the higher surface areas, are more active and provide shorter times for gelation and hardening. Thus, lightburned magnesium oxide, having a surface area of less than about 25 square meters per gram, is slow acting and generally will not be used when it is desired to have the binder composition cure in a relatively short period of time at temperatures below about 120° F. However, for some applications, such as for coated abrasives, it is desired that the magnesia be relatively slow acting and surface areas of about 10 to 25 square meters per gram (10 $m^2/g$ to 25 $m^2/g$) are preferred. On the other hand, magnesia having a higher surface area, such as about 65 square meters per gram ($m^2/g$) and above, will harden the same binder composition in a shorter period of time. For many applications, using magnesia having a surface area of about 25 to 65 square meters per gram is suitable. surface areas of less than about 25 square meters per gram will generally be used when it is desired to substantially prolong the open time or working time of the binder. Hardburned magnesia reacts too slowly as a hardener to be of practical value, and deadburned magnesia is sufficiently inert so that it is used conventionally as a refractory with phenolic resin binders.

The phenolic resole resins of this invention contain one or more volatile solvents, including water. Loss of solvent in the thermally cured compositions leads to increased porosity and permeability to liquids and decrease of strength. One means for obtaining the higher strength and less porosity is to use a larger quantity of lightburned magneium oxide hardener. However, this will shorten the time of viscosity build up and gelation. It has now been found that a mixture of lightburned magnesium oxides having at least two different surface areas can provide the improved results such as increased strength without substantially accelerating the viscosity build up. To attain such improved results, the surface area of one portion of the mixture is at least 50 square meters per gram of the magnesia hardener and the other portion has a surface area of from about 10 to 25 square meters per gram. One part, by weight, of the high surface area hardener is mixed with from about 0.5 to 4 parts and preferably 1 to 3 parts of the hardener having the lower surface area for such improved magnesia hardener. By following this method of using different surface areas, the room or ambient temperature gelation can take place in about the same time as with the higher surface area hardener used alone, even though there is substantially more of the hardener present but the compressive strength of the composition on curing is substantially increased with less porosity and permeability. Furthermore, the fire retardency of compositions having the increased quantity of the magnesia is also improved. Compositions containing the lightburned magnesia of different surface areas will contain a retarder of this invention, optionally an ester functional hardening agent as well as fillers, modifiers, aggregate, and other additives at the same concentration as with lightburned magnesium oxide which does not contain a mixture of the hardener having different surface areas.

The quantity of lighburned magnesium oxide or magnesium hydroxide which is used in this invention as a hardener is an amount sufficient to increase the rate of gelation or hardening of the phenolic resole resin. This quantity can vary over a wide range. The quantity of the magnesium hardener used will vary depending on whether or not an ester hardening agent is also used in the composition, the surface area of the magnesium oxide, the specific ester hardening agent, the quantity of magnesium and ester hardening agent or agents, the temperature, and the desired result. Thus, the magnesium oxide or magnesium hydroxide hardening agent will generally vary from about 2% to 40% by weight of the resin and particularly from about 5% to 35% by weight of the resin in the various compositions and methods of this invention. However, when mixtures of lightburned magnesium oxide having different surface areas is used, the quantity of the magnesium oxide preferably varies from about 5% to 50% or more by weight of the resin. When magnesium hydroxide hardener is used without the ester hardening agent, it is preferred that from about 10% to 40% by weight be used, based on the weight of the resin, and particularly 15% to 30% by weight based on the weight of resin. When the magnesium oxide or magnesium hydroxide is used together with an ester functional hardening agent, is is preferred that the quantity of magnesium oxide or magnesium hydroxide hardening agent vary from about 2% to 30% by weight of the resin, and particularly, from about 5% to 20%.

THE ESTER HARDENING AGENT

The ester functional hardening agent, also referred to as ester functional curing agent, accelerates the hardening of the resole when used with the magnesium hardeners while at the same time use of both magnesium hardening agent and ester hardening agent mixed with the resole resin provide a hardening system which is very sensitive to small quantities of the retarders of this invention. Mixtures of phenolic resole resins and an ester functional hardening agent in the absence of magnesia, or other added alkali, will not harden at 70° F. within several days or longer. The ester functionality for hardening of the phenolic resole resin can be provided by lactones, cyclic organic carbonates, carboxylic acid esters, or mixtures thereof.

Generally, low molecular weight lactones are suitable as the ester functional hardening agent, such as beta or gamma-butyrolactone, gamma-valerolactone, caprolactone, beta-propiolactone, beta-butyrolactone, beta-isobutyrolactone; beta-isopentyllactone, gamma-isopentyllactone, and delta-pentyllactone. Examples of suitable cyclic organic carbonates include, but are not limited to: propylene carbonate; ethylene glycol carbonate; 1,2-butanediol carbonate; 1,3-butanediol carbonate; 1,2-pentanediol carbonate; and 1,3-pentanediol carbonate.

The carboxylic acid esters which can be used in this invention include phenolic esters and aliphatic esters.

The aliphatic esters are preferably those of short or medium chain length, e.g., about 1 to 10 carbon mono- or polyhydric, saturated or unsaturated alcohols with short or medium chain length, e.g., about 1 to 10 carbon aliphatic, saturated or unsaturated carboxylic acids which can be mono- or polycarboxylic. The preferred aliphatic esters are those of alkyl, mono-, di-, or trihydric alcohols with alkyl, or mono-, or diunsaturated acids which can be mono-, di-, or tricarboxylic. The carboxylic acids can be substituted with hydroxy, cyano, chloro, or bromo groups.

As to aromatic esters, such esters can be obtained by esterifying the aromatic, e.g., phenolic, group or groups of a mono- or polyhydric aromatic phenol to prepare a formate or acetate ester of such aromatic compound. Additionally, the aromatic ester can be an esterified phenolic compound containing one or more phenolic hydroxyl groups and/or one or more esterified phenolic hydroxyl groups and further containing one or more esterified methylol groups positioned ortho and/or para to a phenolic hydroxyl group or esterified phenolic hydroxyl group. Such phenolic esters and their method of manufacture are disclosed in U.S. Ser. No. 450,989 filed Dec. 15, 1989 entitled "Phenolic Resin Compositions" with P. H. R. B. Lemon et al as inventors which in turn is based on GB 8829984.7 filed Dec. 22, 1988 with the same inventors and both the U.S. and British cases are incorporated herein by reference.

It will be understood that the esterified phenolic compound used may be a mono-, a di- or a polyesterified methylolated mono-, di- or polynuclear phenol wherein at least one esterified methylol group is attached to an aromatic ring carbon atom ortho or para to a phenolic hydroxyl group or esterified phenolic hydroxyl group. The acid portion of the phenolic esters can be the same as those of the aliphatic esters.

Specific carboxylic acid esters include but are not limited to: n-butyl formate; ethylene glycol diformate; methyl and ethyl lactates; hydroxyethyl acrylate; hydroxyethyl methacrylate; n-butyl acetate; ethylene glycol diacetate; triacetin (glycerol triacetate); diethyl fumarate; dimethyl maleate; dimethyl glutarate; dimethyl adipate; 2-acetyloxymethyl phenol; 2-methacryloyloxymethyl phenol; 2-salicyloyloxymethyl phenol; 2-acetyloxymethyl phenol acetate; 2,6-diacetyloxymethyl p-cresol; 2,6-diacetyloxymethyl p-cresol acetate; 2,4,6-triacetyloxymethyl phenol; 2,4,6-triacetyloxymethyl phenol acetate; 2,6-diacetyloxymethyl phenol acetate; 2,2',6,6'-tetraacetyloxymethyl Bisphenol A; and 2,2',6,6'-tetraacetyloxymethyl Bisphenol A diacetate. Also suitable are: cyanoacetates derived from 1 to 5 carbon atom aliphatic alcohols; formates and acetates of benzyl alcohol, alpha,alpha-dihydroxyxylenols, phenol, alkyl substituted phenols, dihydroxybenzenes, bisphenol A, bisphenol F, and low molecular weight resoles. At times, it is advantageous to use mixtures of the ester functional hardening agents.

Gaseous esters, such as $C_1$ to $C_2$ alkyl formates, can be used as ester functional hardening agents in low density articles or when applying the binders to fabric or paper substrates. When gaseous esters are used as hardening agents, the ester is generally not mixed with the resin binder and aggregate but rather is supplied as a gas to the shaped article as is well known in the art.

The ester functional hardening agent is present in an amount sufficient to increase the tensile and compressive strength of the hardened composition. Such quantity also increases the rate of hardening of the phenolic resole resin in the presence of the magnesium hardener and will vary over a broad range such as that of about 5% to 40% by weight of the phenolic resole resin and preferably from about 10% to 25% by weight of the resin. As with said magnesium hardening agent, the exact quantity will depend on the particular ester hardener used, the amount and specific magnesium hardener used, the temperature at which the composition is used or stored, and desired results.

THE PHENOLIC RESOLE RESIN

A broad range of phenolic resole resins may be used in this invention. These can be phenol formaldehyde resole resins or those wherein phenol is partially or completely substituted by one or more phenolic compounds such as cresol, resorcinol, 3,5-xylenol, bisphenol-A, or other substituted phenols and the aldehyde portion can be partially or wholly replaced by acetaldehyde or furaldehyde or benzaldehyde. The preferred phenolic resole resin is the condensation product of phenol and formaldehyde. Resole resins are thermosetting, i.e., they form an infusible three-dimensional polymer upon application of heat and are produced by the reaction of a phenol and a molar excess of a phenol-reactive aldehyde typically in the presence of an alkali or alkaline earth metal compound as condensing catalyst. Preferred phenolic resole resins used in this invention have less than about 1% and preferably not more than 0.5% by weight of water soluble sodium or potassium. Typically, the resole resin will be a phenol-formaldehyde resin produced by reacting phenol and formaldehyde in a molar ratio (phenol: formaldehyde) within the range of from about 1:1 to 1:3. A preferred molar ratio for use in this invention ranges from about one mole of the phenol for each mole of the aldehyde to about 1 mole of phenol for 2.2 moles of the aldehyde and particularly a range of phenol to aldehyde of 1 to 1.2 to 1 to 2. The phenolic resole resin will usually be used in solution.

The pH of the phenolic resole resin used in this invention will generally vary from about 4.5 to 9.5 with a pH of 5 to 8.5 being preferred. Free phenol will typically be 2% to about 25% by weight of the resin with preferred levels being 5% to about 12%. The molecular weight of the resin will vary from about 200 to 5000 weight average molecular weight with 300 to about 2000 being preferred. All other things being equal, higher molecular weights and lower free-phenol will provide shorter gel or hardening time and increase strength development. The weight average molecular weight (Mw) is measured using gel permeation chromatography and phenolic compounds and polystyrene standards. The sample molecular weight to be measured is prepared as follows: The resin sample is dissolved in tetrahydrofuran and slightly acidified with 1N hydrochloric or sulfuric acid and dried over anhydrous sodium sulfate. The salts which result are removed by filtration and the supernatent liquid run through a gel permeation chromatograph.

The resin solids in the resole resin can vary over a broad range, such as that of about 50% to 90% by weight of the phenolic resole resin. Preferably, the resin solids vary from about 50% to 80% by weight of the phenolic resole resin. The viscosity of the phenolic resole resin, or simply the resin, can vary over a broad range such as that of about 100 to 4,000 cps at 25° C. Preferably, the viscosity varies from about 200 to 3,000 cps at 25° C. and particulary from about 250 to 2,000 cps at 25° C. The viscosity measurements herein are given in centipoises (cps) as measured by a Brookfield RVF viscometer at 25° C. or by Gardner-Holt viscosities at 25° C. The Gardner-Holt viscosities which are in centistokes are multipled by the specific gravity (generally 1.2) to give the cps at 25° C.

The quantity of resin based on aggregate, when aggregate is used for the raw batch compositions, can vary over a broad range, preferably from about 3% to 20% by weight of resin based on the weight of aggregate and particularly from about 5% to 15% of resin based on the weight of aggregate.

The liquid portion of the resin is water or water together with a non-reactive solvent. The resin can include a number of optional modifiers or additives such as silanes, hexa, or urea. Solvents in addition to water can be selected from alcohols of one to five carbon atoms, diacetone alcohol, glycols of 2 to 6 carbon atoms, mono- and dimethyl or butyl ethers of glycols, low molecular weight (200-600) polyethylene glycols and methyl ethers thereof, phenolics of 6 to 15 carbons, phenoxyethanol, aprotic solvents, e.g., N,N-dimethylformamide, N,N-dimethylacetamide, 2-pyrrolidinone, N-methyl-2-pyrrolidinone, dimethyl sulfoxide, tetramethylene sulfone, hexamethylphosphoramide, tetramethyl urea, methyl ethyl ketone, methyl isobutyl ketone, cyclic ethers such as tetrahydrofuran and m-dioxolane, and the like.

Typical water contents for the resins used in this invention will vary from about 5% to 20% by weight of the resin.

Organofunctional silane adhesion promoters are recommended for use when compositions of this invention include fibers and siliceous aggregates, such as silica sands, crushed rock and silicates, and alumina based aggregates.

The organofunctional silanes are used in a quantity sufficient to improve adhesion between the resin and aggregate. Typical usage levels of these silanes are 0.1 to 1.5% based on resin weight. Illustrative of silanes that are useful are those represented by the generic Formula I:

$$(RO)_3-Si-CH_2-CH_2-CH_2-X \quad \text{Formula I}$$
where $R = CH_3$, or $C_2H_5$

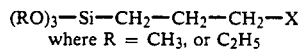

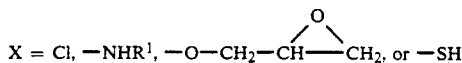

and $R^1 = H, CH_3, C_6H_5(\text{phenyl}), -CH_2CH_2NH_2,$

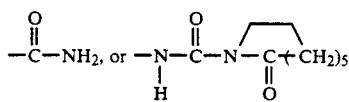

Other useful silanes not represented by Formula I are 2-(3,4-epoxycyclohexyl)ethyl trimethoxysilane, bis(-trimethoxysilylpropyl)ethylenediamine, N-trimethoxysilylpropyl-N,N,N-trimethylammonium chloride and secondary amino silane $[(RO)_3Si-CH_2CH_2CH_2]_2NH$.

THE RETARDERS

The retarders used in this invention are materials which decrease the solubility or solubilization of magnesium in the hardenable binders which contain the phenolic resole resin, a magnesium hardener, and optionally an ester functional hardening agent. Decreasing the solubility of the magnesium hardener slows or delays hardening of the resin. As mentioned in the Background of the Invention for this application, U.S. patent application Ser. No. 149,102, which was filed on Jan. 27, 1888, shows the use of aliphatic alcohols for retarding or moderating the hardening of phenolic resole resins. However, the retarders as referred to in the instant application are materials which decrease the solubility of magnesium in the hardenable binder. The retarders of this invention decrease the amount of soluble magnesium in the binder as compared to such binder without the retarder. The aliphatic alcohols retard hardening by a different mechanism.

A wide range of materials have been found which decrease the solubility of magnesium in the compositions of this invention and retard the hardening.

In the case of ionizable compounds, it is the anion, e.g., F−, which determines whether a material is a retarder in the present invention. Thus the cation, e.g., Na+, H+, Li+ does not change the anion from being a retarder, although it may have some effect on the amount of retardation. Salts containing the following cations are particulary suitable in the retarder compounds of this invention: sodium, potassium, lithium, magnesium, ammonium, and lower alkyl substituted ammonium such as those having from 1 to 4 carbon atoms in each alkyl group. However, some compounds which do not appear to ionize are also retarders.

The retarders used in this invention have some solubility in the binder compositions. Such solubility can be different than that in water, particularly when the reaction medium contains substantial quantities of ester and less than about 15% water. For general purposes, however, the solubility in water of such retarders is at least 0.1% by weight at 25° C. The retarders can be in the acid form, e.g., citric acid, or in a salt form. When the acid form is used in the presence of the magnesium hardeners, the salt of the acid is formed in situ, e.g., the magnesium salt. When added to a phenolic resole resin and hardener composition of this invention, the acid or salt provides the appropriate anion.

Illustrative of retarder anions or retarder compounds, there can be mentioned:

(a) Fluoride and bifluoride anions such as that supplied by hydrofluoric acid, sodium bifluoride, and other fluoride or bifluoride salts;
(b) tetraalkoxy silanes having from 1 to 3 carbon atoms in each alkoxy group as well as partially prehydrolyzed tetraalkoxy silanes of 1 to 3 carbon atoms in each alkoxy group wherein the degree of hydrolysis of such compound can vary over a wide range such as up to about 60% and wherein the alkoxy groups of each molecule can be the same or different;
(c) citrate anions such as that provided by citric acid and salts thereof;
(d) tartrate and aspartate anions such as that from tartaric, and aspartic acid and salts thereof.
(e) oxalate anions such as that provided by oxalic acid and salts thereof;
(f) phosphate anions such as that provided by phosphoric acids and salts thereof;
(g) anions of mono-aminomonocarboxylic acids having from about 2 to 6 carbon atoms and salts thereof;
(h) anions of monoamino polycarboxylic acids such as those having from about 4 to 6 carbon atoms and salts thereof;
(i) anions of iminodi (lower alkyl of 2 to 5 carbon atoms) acids and salts thereof;
(j) organic phosphonic acids such as di-, and polyphosphonic acids, amine derivatives thereof, and salts thereof;
(k) ethylenediaminetetraacetic acid (EDTA);
(l) melamine; and
(m) anions of amino-benzoic acids and salts thereof.

Preferred retarders are compounds selected from the group consisting of: (a) a compound which provides an anion of fluoride, bifluoride, citrate, tartrate, aspartate, oxalate, phosphate, glutamate, malate, aminoacetate, aminopropionate, iminodiacetate, iminodipropionate, and aminobenzoate; (b) a tetraalkoxy silane having from 1 to 3 carbon atoms in each alkoxy group; and (c) a partially hydrolyzed, e.g., up to about 60%, tetraalkoxy silane having from 1 to 3 carbon atoms in each alkoxy group.

It can be seen from the above listing of retarders that many of them are chelating agents which decrease the solubility of magnesium in the binder compositions. However, not all chelating agents decrease such solubility and thus all chelating agents are not retarders.

It should be noted that the presence of calcium cations available to react with the fluoride anions can reduce or even eliminate the fluoride or bifluoride retarder activity. It is believed that this is due to the formation of insoluble fluoride salts of calcium. Therefore, water soluble calcium compounds should be avoided with fluorides or bifluorides or substantially larger quantities of these retarders should be used. Illustrative of undesirable calcium sources for these fluorides there can be mentioned the calcium present in the phenolic resin formed with a calcium catalyst, and calcium containing hardeners of phenolic resole resins.

A preferred group of cations which combine with anions to form the retarder compounds are the hydrogen cation, e.g., such as in hydrofluoric and citric acid and cations of the alkali metals, ammonium, and lower alkyl substituted ammonium having from 1 to 4 carbon atoms in each alkyl group, which form salts of retarder anions.

Illustrative of specific retarder compounds, there can be mentioned: ammonium bifluoride; ammonium fluoride; ammonium phosphate (monobasic); lithium fluoride; phosphoric acid; potassium fluoride; sodium fluoride; sodium phosphate (monobasic); sodium phosphate (tribasic); citric acid; sodium citrate, tetraethoxy silane; tetrapropoxy silane; diethoxydipropoxy silane; glutamic acid; sodium glutamate; melamine; oxalic acid; iminodiacetic acid; iminodipropionic acid; sodium iminodiacetate; potassium tartrate; hydroxy or amino succinic acids such as tartaric acid, malic acid and aspartic acids; aminoacetic acid (glycine); 2-aminopropionic acid (alpha alanine); 3-aminopropionic acid (B-alanine); phosphoric acid; phosphonic acids such as 1-hydroxyethylidene-1,1-diphosphonic acid, aminotri (methylenephosphonic acid), hexamethylenediamine tetra (methylenephosphonic acid), hexamethylenediamine tetra (methylene phosphonic acid), and diethylenetriaminopenta (methylene phosphonic acid).

The quantity of retarder used in this invention is an amount or quantity sufficient to decrease the rate of viscosity increase, gelation and hardening of the resin and such quantity can vary over a wide range depending on the activity of the particular retarder, the amount of retardation desired, the room or ambient temperature, and the type and quantity of magnesium and ester hardening agents. Thus, the quantity of retarder can vary from about 0.05% or 0.1% to 5% by weight based on the weight of the phenolic resole resin. With fluorides and bifluorides as little as about 0.05% by weight is effective. With other retarders, a higher amount in generally needed. For tetraalkoxy silanes and hydrolyzed tetraalkoxy silanes the preferred quantity of retarder is from about 0.5 to 2% based on weight of resin. With other retarders it is preferred to use at least 0.3% and, particularly, at least 0.5% by weight of the resin.

Another preferred group of retarders are those which contribute to cross-linking of the phenolic resole resin upon thermal curing. Illustrative of such retarders there can be mentioned those having reactive amino groups, such as the amino acids, aminobenzoates, and melamine. Such crosslinking of the resin improves tensile and compressive strength of the compositions. By the term "reactive amino groups" is meant a total of at least 2 sites on one or more amino groups of a compound which will effectuate cross linking with the phenolic resole resin, e.g., at least one primary amino group or at least two secondary amino groups on a retarder compound.

FILLERS, AGGREGATES, AND MODIFIERS

The compositions of this invention can include fillers, modifiers, and aggregates which are conventionally used with phenolic resole resins. The aggregate material when used in the compositions of this invention may be any material which may be bound with a phenolic resole resin binder to form a shaped article. The aggregate material may be a particulate material such as that in granular, powder, flake, or fibrous form. Suitable aggregate materials include but are not limited to: magnesite, alumina, zirconia, silica, zircon sand, olivine sand, silicon carbide, silicon nitride, boron nitride, bauxite, quartz, chromite, and corundum. For certain applications, low density aggregate materials such as vermiculite, perlite, and pumice are preferred. For other applications, preferable high density aggregates include: limestone, quartz, sand, gravel, crushed rock, broken brick, and air cooled blast furnace slag. Sand, gravel, and crushed rock are preferred aggregates in polymeric concrete. Fillers such as calcium carbonate, kaolin, mica, wollastonite, and barites can be used in quantities of up to about 50% by weight of the formulated resin product. The quantity of such fillers can equal the quantity of the resin. Hollow microspheres of glass, phenolic resin, or ceramic can also be used in quantities of up to about 20% of the formulated resin product. Other optional modifiers include fibers such as steel, alkali resistant glass, polyester, and polypropylene.

The raw batch compositions produced by combining the hardenable resin binder, aggregate, hardening agent or agents, and retarder may additionally comprise any of a number of optional modifiers or additives including non-reactive solvent, silanes, hexamethylenetetraamine, clays, graphite, iron oxide, carbon pitch, silicon dioxide, metal powders such as aluminum, magnesium, silicon, surfactants, dispersants, air detraining agents, and mixtures thereof. In foundry applications and sand-binder overlays, or where silica sand is used as the aggregate, a preferred additive is a silane adhesion promoter, such as gammaaminopropyl triethoxysilane. In refractory applications, clays, metal powders (e.g., aluminum, magnesium, or silicon), and graphite are preferred additives. When graphite or metal powders of aluminum, magnesium, or silicon or mixtures thereof are used as additives, the amount of aggregate, such as alumina or magnesia, can be reduced to as low as about 70% by weight of the composition.

APPLICATIONS

The methods and compositions of this invention are particulary useful in: preparing shaped articles such as bonding refractory aggregate for the manufacture of bricks and castable monolithic shapes; polymer concrete, also referred to as resin-filled aggregate, for repair or protective overlay for concrete to provide resistance to acids, oils, and organic solvents; manufacture of precast shapes such as pipe, tile, wall panel, and the like, where hydrolytic, solvent, acid, and heat resistance are desirable; and impregnated paper for use as auto oil and air filters. Furthermore, the binder compositions of this invention are suitable for bonding abrasive grits such as for use in coated and bonded abrasives.

Refractory shaped articles include refractory brick and monolithic refractories. The conventional refractory compositions contain: a hardenable phenolic resole resin; magnesium hardening agent; aggregate; and optionally ester functional hardening agent, metal powders and graphite. Aggregates normally used for refractories are: magnesia (periclase); alumina; zirconia; silica; silicon carbide; silicon nitride; boron nitride; bauxite; quartz; corundum; zircon sand; olivine sand; and mixtures thereof. Preferred aggregates for refractory use are refractory magnesia, also referred to as periclase, alumina, and silica. The amount of graphite generally varies from about 5% to 20% by weight of the refractory aggregate and the quantity of metal powder such as aluminum, magnesium, and silicon will generally vary from about 1% to 5% by weight of refractory aggregate.

In the case of refractories such as brick, the refractory composition is pressed into the desired shape and then thermally cured. At times, there is a delay after preparing the composition and before pressing it into the desired shapes with subsequent thermal curing such as at temperatures of about 230° F. (110° C.). Such delay can be of a few minutes or it can last over a period of a day or two. During such delay, the binder composition will increase in viscosity and become drier. Subsequent pressing of such binder into a shaped article such as brick and thermal curing produces articles having diminished strengths. The addition of a retarder slows the viscosity increase and provides pressed and thermally cured articles with greater tensile strength.

In some refractory applications, prefabricated forms, other than brick-like shapes, are required. These "monolithic refractories" are cast by placing a liquid flowable binder-aggregate system into a mold and then filling out the mold by using vibration. Once the binder-aggregate system room temperature hardens, the mold is stripped away so that the shape can be thermally cured and readied for use, either before or after transporting the monolithic refractory to its place of use. The retarders of the present invention provide increased working time for filling out the mold and compaction of the composition.

Hydraulic refractory calcium aluminate cements constitute the current binder technology for monolithic refractories. However, chemical interraction between molten metal such as iron, steel, and aluminum and hardened cements create problems such as dissolving, softening, or simply weakening hydrated cement phases which in turn increase permeability of the hardened refractory shape. This, in turn, severely limits the service life of the refractory shape. The binder compositions of this invention are advantageous for use with such castable refractories since they have: good fluid mix consistency; adequate working time; room temperature hardening,; and sufficient mechanical strength. After room temperature hardening, the monolithic can be thermally cured or carbonized, preferably at the site of use such as part of a furnace lining. Carbonizing takes place at temperatures above 800° C. or 1,000° C.

Polymer concrete is formed by polymerizing a monomer, resin, or mixture thereof in the presence of an aggregate. Polymer concrete had its initial application in the repair of Portland Cement concrete. Today, they have many other uses as described herein above. The binder compositions of this invention are particularly advantageous for this use since the retarder provides extended troweling or working time, the lack of high alkalinity and high sodium or potassium levels does not affect the aggregate and the composition can cure at room or ambient temperature in a reasonable time indoors or outdoors.

As mentioned hereinabove, the binder compositions of this invention are also particularly advantageous for use in the manufacture of coated abrasives. A primary reason for this is that the retarder provides extended shelf life to the completely formulated mixture. This cuts down on the number of resin formulated mixtures which need to be prepared. Working and storage time is limited in the absence of a retarder and during such working and storage time the viscosity increase of the resin impairs reproducibility of the coating thickness and strength of adhesive bond to the abrasive particles and backing material.

The abrasive materials used for coated abrasive articles are broken and pulverized glass, flint, emery, garnet, zirconia, and mainly aluminum oxide and silicon carbide. The backing for such abrasives can be Kraft paper, but in most cases special papers which have been modified with rubber, acrylic resin, and other polymers can be used. Anisotropic strength is preferred for belts. Specially woven cotton or linen fabrics can also be used. Fillers such as calcium carbonate, e.g., up to 100% by weight of the resin and generally about 50% to 90% by weight of the resin are generally added to the "size" or second resin coating of the backing material.

In the coating process for the coated abrasives, the backing material, which is generally available in rolls of up to about two meters wide, is coated with the phenolic resole resin on a roll coating machine. The quantity of the first coat, also called the make coat, is approximately 100 to 400 grams per square meter and depends mainly upon the size of the abrasive grain used. The abrasive grain is then applied to the resin coating having the retarded gelling rate due to use of retarder by either gravity coating or electrostatic coating. The grain should be fixed in the resin loaded backing vertical to the grains longitudinal axis. The loaded web is then transported to a festoon dryer where it is dried but not hardened or alternatively in this invention the loaded web is heated at a temperature of about 170° F. (76° C.) to 212° F. (100° C.) and preferably about 185° F. (85° C.) to 205° F. (96° C.) for a time sufficient to provide a coating which is not tacky to the touch but at the same time not fully cured. By use of the heating step to provide the tack free surface prior to the "size" or subsequent coating of resin, the processing time is diminished to a few, e.g., 2 or 3, hours instead of 10 or 12 hours. The web, with the hardened uncured resin, is then stretched and fed to another coater or back to the first. Here a second coating of the phenolic resole binder is applied over the abrasive and make coat. This second coat is called the size coat, and the abrasive grain is more fully imbedded and fixed in the resin after its application. The final drying and curing is generally performed in the main festoon dryer according to an exact program wherein above 80° C. (176° F.) the temperature is increased slowly to prevent too fast curing of the surface and formation of blisters. The maximum final drying and curing temperature should not exceed 120° C. (248° F.) to 130° C. (266° F.). The webs are finally made into rolls, blades, sheets, rondels, or endless ribbons.

In order that those skilled in the art may more fully understand the invention presented herein, the following procedures and examples are set forth. All parts and percentages in the examples, as well as elsewhere in this application, are by weight and temperatures are in degrees Fahrenheit (°F.) unless otherwise stated.

PROCEDURE FOR THE PREPARATION AND TESTING OF POLYMER CONCRETE FOR COMPRESSIVE STRENGTH

A 5-quart Hobart mixer was charged with
990.0 g Industrial Grade Sand No. 4 (Vulcan Materials Co.) This is also referred to herein as coarse sand.
360.0 g Industrial Grade Sand No. 10 (Vulcan Materials Co.) This is also referred to herein as medium particle size sand.
150.0 g Oklahoma Mill Creek Foundry Sand (U.S. Silica) This is also referred to herein as fine sand.
and 22.5 g Magchem 50 (65 square meters per gram) a lightburned magnesia from Martin Marietta Magnesia Specialties.
180.0 g of Resin A containing 1.8 g silane, namely 3-glycidoxypropyl trimethoxysilane, was added. The resin-aggregate was mixed for a total of 2 minutes (at medium setting for 1 minute and high setting for 1 minute) then 45.0 g of γ-butyrolactone and 15.0 g water were added and mixing continued for 1 minute at medium setting and an additional 1 minute at a high setting. The mixture was then transferred to a mold containing 15 cylindrical cavities of 1½" depth and 1½" diameter. Each cavity was lined with thin polyester film to ease removal of hardened specimens. The charged mold was then vibrated for 2 minutes at a setting of 5.1 using a Syntron Vibrating Table. Surfaces were lightly troweled then the molds were transferred to a constant temperature (72° F.+/−2° F.) and humidity (51%+/−2%) room. Hardened specimens were removed from the mold after 24 hours and either tested or for evaluation at a later date. Compressive strengths for polymer concrete were determined on a Tinius Olsen tensile test machine at a slow speed of 0.15 inches/minute. Pounds to failure divided by 1.77 represents compressive strength in psi.

PROCEDURE FOR THE PREPARATION AND TESTING OF POLYMER CONCRETE FOR TENSILE STRENGTH

A 5 quart Hobart mixer was charged with 891.0 g Industrial Grade Sand No. 4,324.0 g Industrial Grade Sand No. 10, both from Vulcan Materials Co., 135.0 g Oklahoma Mill Creek Foundry Sand (U.S. Silica), and 13.5 g Magchem 50 (Martin Marietta Magnesia Specialties). To this mixture, was added 162.0 g of Resin A containing 1.62 g (grams) silane namely 3-glycidoxypropyltrimethoxy silane. The resin/aggregate mixture was mixed 2 minutes, one at medium speed and one at high speed. This mixture was then transferred to aluminum forms (pre-sprayed with release agent) and cast to form dogbone specimens 3 inches long, 1 inch thick and 1 inch wide at the neck. The sprayed forms had been previously placed on polyester film atop an aluminum tray. Dogbone molds were filled and vibrated for 2 minutes at a setting of 5.1 on a Syntron Vibrating Table. The surfaces were lightly troweled and then the assembly transferred to a constant temperature (72° F.+/−2° F.) and humidity (51%+/−2%) room and allowed to harden. After 24 hours, samples were removed from molds and either tested or stored for evaluation at a later date. Tensile strengths were determined on a Tinius Olsen tensile test machine at a slow speed of 0.15 inches/minutes. Readings in psi are indicated on digital readout.

DETERMINATION OF SOLUBLE MAGNESIUM FROM REACTION OF RESIN A AND MAGNESIA HARDENER WITH/WITHOUT ESTER HARDENER AND WITH/WITHOUT ADDITIVE

A glass screw cap vial (28×95 mm) was charged with
6.0 g Resin A
0.5 g water
1.5 g γ-butyrolactone (or 2-methoxyethyl ether, as indicated in the Examples or Tables herein),
which was briefly mixed to homogenize the solution whereupon 0.75 g lightburned magnesia (Magchem 50; Martin Marietta Magnesia Specialties) was added. The mixture was thoroughly mixed for 1 minute using a S/P Vortex Mixer (American Scientific Products) at a setting of 9. 1.5 g of the uniform dispersion was immediately transferred to a vial containing 4.5 g N,N-dimethylformamide (DMF) and 0.5 g methanol. After mixing well for 1 minute, the contents were transferred to a centrifuge tube which was centrifuged for 5 minutes. The relatively clear liquor was filtered through a teflon microfilter. A weighted amount of clear solution was ashed in a platinum dish which was heated at 600° C. in a muffle furnace. The residue was treated with aqueous hydrochloric acid, diluted appropriately, and analyzed for magnesium by atomic absorption.

The above freshly mixed solution/magnesia dispersion (1.5 g per vial) was transferred to other empty vials which were placed in a 25° C. water bath. At appropriate times, 4.5 g DMF was added and, after 2 to 3 minutes of mixing, complete dispersion of resin was achieved. Then 0.5 g methanol was added, remixed, and then centrifuged and analyzed as described above. % Magnesium in original sample=% magnesium found×4.27 factored to correct for solvent dilution.

FLOW DETERMINATION OF RESIN/HARDENER/MAGNESIA/AGGREGATE MIX

A dome shaped 150 ml glass bowl 3" wide and 2" deep is lightly sprayed with release agent and charged, in 3 portions, with composite mix derived from resole, ester hardener, lightburned magnesia hardener, and aggregate (silica sands or refractory dead burned magnesias). The composite mix is gently tapped in place with a pestle after each addition. The bowl and contents are inverted onto polyester film taped to a Syntron Vibrating Table. The table is then vibrated for 20 seconds at a setting of 8 (¾ of maximum setting). The diameter (in inches) of the resulting hemisphere is measured and % flow calculated by:

$$\frac{(\text{Diameter measured} - 3.0) \times 100}{3.0}$$

PROCEDURE FOR GEL DETERMINATION

A screw cap glass vial (28×95 mm) is changed with: 6.0 grams Resin A or Resin B (as indicated in the Tables or Examples); additives if any, as indicated in Tables or Examples; 0.5 grams water; and 1.5 grams (g.) gamma butyrolactone. The solution is mixed well prior to addition of 0.75 g of lightburned magnesia having a surface area of 65 square meters per gram. The mixture is thoroughly mixed for one minute using a S/P Vortex Mixer of American Scientific Products at a setting of 9. Five grams (g) of this mixture is immediately transferred to a glass test tube (18×155 mm). A glass rod with a magnetized head fitting is introduced into the mixture and fitted to a Sunshine Gel Time Meter which is then turned on. The tube is immersed in a 25° C. water bath throughout the test.

Determination of gel times with Resin C used 5.0 g of mixture derived from 8.0 g of Resin C, 1.2 g gamma-butyrolactone and 1.6 g of the lightburned magnesia having a surface area of 65 square meters per gram. Solvents were optional. Gel determinations were run at 25° C. or at 60° C. (boiling chloroform).

100° C. gel times with Resin D used 5.0 g of a mixture derived from 8.4 g Resin D, 0.0081 ester equivalents of organic hardener, 2-methoxyethyl ether and 0.16 g of lightburned magnesia having a surface area of 25 square meters per g. The weight sum of ester hardener and 2-methoxyethyl ether was kept constant.

Gel times with resin E used 3.85 g resin and 1.16 g of ethyl lactate or 4.0 g Resin E and 1.0 g Triacetin.

PHENOLIC RESOLE PROPERTIES

Phenolic Resole Resin E is a commercial product sold as Alphaset 9,000 by Borden Chemical Company. Resin E is not a resin used in this invention except for comparison purposes. This resin has approximately 50% solids, 50% water, a viscosity of 150 cps at 25° C., and a pH of 13.

Phenolic Resole Resin A, or simply Resin A, is a phenol formaldehyde resole resin prepared by reacting phenol (P) with 50% formaldehyde (F) at a F/P molar ratio of 1.25 using sodium hydroxide as catalyst. This resin intermediate is formulated with acetic acid, ethanol, methanol, and N,N-dimethylformamide (DMF) to provide Resin A which has: a Gardner-Holt viscosity at 25° C., a viscosity of 2,560 Centistokes, or approximately 3,000 cps at 25° C.; 68% solids; 7% free phenol; 10% lower alkyl alcohols; 12% water; 4% DMF; a pH of 5.9, and a weight average molecular weight of 4,000.

Phenolic Resole Resin B, or simply Resin B, is a more alkaline, water dilutable analog of Resin A without the acetic acid, and N,N-dimethylformamide (DMF), but instead formulated with ethanol to provide a 7.5% ethanol content and potassium hydroxide 0.75% based on Resin B to provide a pH of 8.9 to the final resin solution as well as a weight average molecular weight of 4,000 and 67% solids, 18% water, and 7% free phenol, all based on the weight of resin (B.O.R.).

Phenolic Resole Resin C, or simply Resin C, is prepared by reacting phenol (P) with 50% formaldehyde (F) at a F/P molar ratio of 1.25 using sodium hydroxide catalyst. This resin has a viscosity of 250 cps at 25° C.; 68.6% solids B.O.R.; 15.7% free phenol B.O.R.; 11.7% water B.O.R.; a pH of 8.9 and a weight average molecular weight of 290.

Phenolic Resole Resin C, or simply Resin C, is prepared by reacting phenol (P) with 50% formaldehyde (F) at a F/P molar ratio of 2.0 using potassium hydroxide catalyst. This resulting intermediate resin has a weight average molecular weight of 390 and is formulated with phenol and Dowanol DPnB (dipropylene glycol monobutyl ether-Dow Chemical) to give the final resin having: solids of 78%; free phenol of 16%; water of 8%; Dowanol DPnB of 8%; potassium of 1.3%; a pH of 9.2; and a viscosity at 25° C. of 3450 cps.

EXAMPLE 1

In this example, various additives were tested at 2%, based on resin weight (B.O.R.), unless indicated otherwise, for their effect on the rate of hardening of the phenolic resole resin in the presence of both magnesium hardener and ester hardener at about 25° C. The rate of hardening was determined by measuring time of gelation in accordance with the hereinabove procedure entitled "Procedure For Gel Determination." The resin employed was Resin A, the ester was γ-butyrolactone, and the magnesium hardener was Magchem 50. The control for Table 1 was the composition without additive which gave a gel time of 48 minutes. Also, for a lower molecular weight analog of Resin A, which is indicated on Table 1 with the superscript "(a)", the composition without additive gave a gel time of 67 minutes. Thus, gel times of less than 48 minutes, wherein the time is not followed by the superscript "(a)," of the various additives denote accelerators whereas get times of more than 48 minutes, wherein the time is not followed by the superscript "(a)," denote retarders. The results of this example are shown in Table 1. Some of the more significant results shown in Table 1 are as follows.

Flouride and biflouride salts are the most effective retarders. The weaker effect of lithium flouride is attributable to its lower solubility. Phosphoric acid and salts thereof are effective retarders. Surprisingly, related materials such as phosphorous acid, sodium phosphite, and hypophosphorous acid are accelerators. The chlorides are the most effective accelerators. Two classes of additives, apart from the fluoride and bifluoride, are particularly effective retarders, namely, lower alkyl tetraalkoxy silanes, e.g., tetraethoxy silane, which is also referred to as ethyl orthosilicate, and such partially hydrolyzed silanes as well as hydroxy and amino containing di- and tricarboxylic acids, e.g., aspartic, citric, malic, and tartaric acid, and iminodiacetic acid, whereas oxalic acid is a moderately effective retarder. Preformed very water insoluble magnesium oxalate is only very weakly retarding. Organic chlorine or bromine containing materials that react with water or alcohols at about 25 degrees C. at pH of about 5 to 9 to liberate chloride or bromide ions act as reactive accelerators.

TABLE 1

Effect of Additives on Gel Time of Resin A/ γ-Butyrolactone/Magnesia Hardener

System: 6.0 g Resin A  1.5 g γ-Butyrolactone
0.5 g water  0.75 Lightburned Magnesia having surface area of 65 square meters per gram (65 m²/g)

| Mix | Additive (2% on Resin) (Unless otherwise indicated) | Gel Time, Min. (25° C.) |
|---|---|---|
| | Inorganic | |
| 1 | None | 48 67[a] 62[a][b] |
| 2 | Ammonium Bifluoride (0.5% B.O.R.) | 148 241[a][b] |
| 3 | Ammonium Chloride | 7 |
| 4 | Ammonium chloride (0.33% B.O.R.) | 28 |

TABLE 1-continued

Effect of Additives on Gel Time of Resin A/
γ-Butyrolactone/Magnesia Hardener

| | | |
|---|---|---|
| 5 | Ammonium Fluoride | 128 |
| 6 | Ammonium Nitrate | 33 |
| 7 | Ammonium Phosphate Monobasic | 85 |
| 8 | Ammonium Sulfate | 23 |
| 9 | Ammonium Sulfite | 32 |
| 10 | Calcium Chloride | 19 |
| 11 | Calcium Formate | 45 |
| 12 | Choline Chloride | 25 |
| 13 | Choline Formate | 37 |
| 14 | Hypophosphorous acid | 40[a] |
| 15 | Lithium Carbonate | 36 |
| 16 | Lithium Fluoride | 61 |
| 17 | Lithium Nitrate | 17 |
| 18 | Lithium Sulfate | 34 |
| 19 | Magnesium Chloride | 6 |
| 20 | Magnesium Oxalate | 56 |
| 21 | Magnesium Sulfate | 44 |
| 22 | Meta phosphoric acid/mono sodium metaphosphate, 1:2 | 74 |
| 23 | Phosphoric Acid | 107 |
| 24 | Phosphorous Acid | 19 |
| 25 | Potassium Cyanate | 37 |
| 26 | Potassium Fluoride | 126 |
| 27 | Potassium Iodide | 39 |
| 28 | Potassium Sulfamate | 16 |
| 29 | Sodium Bromide | 30 |
| 30 | Sodium Carbonate | 55 |
| 31 | Sodium Chloride | 12 |
| 32 | Sodium Bisulfate | 36 |
| 33 | Sodium Bisulfite | 26 |
| 34 | Sodium Dithionite | 42 |
| 35 | Sodium Fluoride | 174 |
| 36 | Sodium Hydroxide (1.4% B.O.R.) | 40 |
| 37 | Sodium Nitrate | 29 |
| 38 | Sodium Nitrite | 46 |
| 39 | Sodium Phosphate, Monobasic | 90 |
| 40 | Sodium Phosphate, Tribasic | 77 |
| 41 | Sodium Phosphite, Monobasic | 31 |
| 42 | Sodium Silicate | 47 |
| 43 | Sodium Sulfate | 22 |
| 44 | Sodium Thiosulfate | 20 |
| Organic | | |
| 1 | Acetic acid | 45 |
| 2 | Acetoguanamine (2,4-diamino-6-methyl-s-triazine) | 60 |
| 3 | Acetylacetone (pentane-2,4-dione at 3% B.O.R.) | 39[a] |
| 4 | Aminoacetic acid (glycine) | 65 |
| 5 | Aminoacetic acid (glycine) | 65 |
| 6 | p-Aminobenzoic acid | 108[a] |
| 7 | 3-Aminopropionic acid (β-alanine) | 66 |
| 8 | Aminotri(methylenephosphonic acid) | 68 |
| 9 | Aspartic Acid | 104 |
| 10 | Benzoguanamine (2,4-diamino-6-phenyl-s-triazine) | 49 |
| 11 | 2,3-Butanedione (Biacetyl) | 75[a] |
| 12 | Chloroacetamide | 52 |
| 13 | Citric Acid | 193 |
| 14 | 2,3-Dibromopropionitrile | 40 |
| 15 | 2,4-Dichloro-6-n-propoxy-s-triazine | 22 |
| 16 | 2,4-Dichloro-6-o-chloroanilino-s-triazine | 26 |
| 17 | Dichlorodiphenyl silane | 24 |
| 18 | α,α-Dichlorotoluene | 46 |
| 19 | Diethyl phosphite | 51 |
| 20 | o,p-Dimethylaminomethyl phenois DMP-10 of Rohm & Hass Co. | 59[a] |
| 21 | EDTA | 73 |
| 22 | Guanidine Hydrochloride | 24 |
| 23 | Glutamic Acid | 76 |
| 24 | Glycolic Acid | 47 |
| 25 | Hexachlorocyclopentadiene | 49 |
| 26 | Hexamethylenetetraamine | 44 |
| 27 | 1-Hydroxyethylidene-1,1-diphosphonic acid | 63 |
| 28 | Imidazole | 56 |
| 29 | Iminodiacetic acid | 103 |

TABLE 1-continued

Effect of Additives on Gel Time of Resin A/
γ-Butyrolactone/Magnesia Hardener

| | | |
|---|---|---|
| 30 | Malic Acid | 118 |
| 31 | Malonic Acid | 55 |
| 32 | Melamine | 66 |
| 33 | Methanesulfonyl Chloride | 22 |
| 34 | Methyl 2,3-dichloropropionate | 43 |
| 35 | N-methyl imidazole | 48 |
| 36 | Oxalic Acid | 86 |
| 37 | Phenyltriethoxy silane | 57 |
| 38 | Succinic acid | 41 |
| 39 | Tartaric Acid | 140 |
| 40 | Terephthalic acid | 56 |
| 41 | Tetraethoxy Silane | >276 |
| 42 | Tetraethoxy Silane (4% B.O.R.) | 327 |
| 43 | Tetraethoxy Silane (0.5% B.O.R.) | 92 |
| 44 | Tetraethoxy Silane (40% hydrolyzed) at 0.5% concentration B.O.R. (Silbond 40 of Akzo Chem., Inc.) | 90 |
| 45 | Tetra n-butylammonium chloride | 38 |
| 46 | N,N,N[1],N[1]-tetramethyl-1,3-propane diamine | 40[a] |
| 47 | Alpha, Alpha, Alpha-trichlorotoluene | 35 |
| 48 | Triethylene diamine | 39 |
| 49 | Alpha, Alpha, Alpha-trifluorotoluene | 49 |
| 50 | Trimethyl Borate | 46 |
| 51 | Trimethyl Phosphite | 53 |
| 52 | 2,4,6-Tris(dimethylaminomethyl)-phenol | 35 |

[a]Resin having a weight average molecular weight of about 3,000 whereas the resin for the other determinations had a weight average molecular weight of about 4,000.
[b]0.75 g lightburned magnesium oxide having a surface area of 10 m$^2$/g used in addition to 0.75 g lightburned magnesium oxide having a surface area of 65 m$^2$/g.

EXAMPLES 2 AND 3

In these examples, tests were run to determine the effect of lightburned magnesia or magnesium hydroxide, esters, and additives on the compressive strength of polymer concrete. These examples were run in accordance with the Procedure For The Preparation and Testing of Polymer Concrete set forth hereinbefore.

For the polymer concrete data shown in Table 2 and 3, the compressive strengths were determined, unless specified otherwise, on room temperature (R.T.) cured specimens using Resin A, γ-butyrolactone as ester, lightburned magnesia or magnesium hydroxide as the alkali, and mixture of silica sands as aggregate.

It can be seen in Table 2 and Table 3 that:

(a) Fluoride retarder lowers R.T. strength after 24 hours, but this relative effect is more dramatic after 8 hours when compared to control. Lithium carbonate and calcium formate increase 1 day R.T. strength, but lithium fluoride (very low solubility) has no effect.

(b) Replacement of magnesia by a chemical equivalent of magnesium hydroxide leads to a dramatic decrease in compressive strength. However, magnesium hydroxide responds to accelerative and retardative effects. Chloride increases 24-hour R.T. compressive strength whereas fluoride decreases strength.

(c) Replacement of γ-butyrolactone ester by an equal weight of inert high boiling solvent (a glycol diether) leads to a dramatic reduction in 3 and 7 day R.T. strength. Four day immersion in 10% acetic acid, after a 3 day dry R.T. cure, leads to a strength decrease relative to a 7-day dry R.T. cure. With butyrolactone, an increase in strength is seen after the acetic acid treatment.

(d) Four day hot (90° C.) water immersion preceded by 3 day dry R.T. cure of concretes prepared using γ-butyrolactone and lightburned magnesia leads to significantly higher strength than systems where inert solvent replaces ester or where magnesium hydroxide replaces magnesia.

(e) Sulfamates which are good accelerators show a negative effect on strength (8 or 24 hours) whereas moderate accelerator $Li_2CO_3$ shows a 24% strength increase after 24 hours.

EXAMPLE 4

In this example, tests were run to determine the effect of surface area of the lightburned magnesia hardener on gel time. The compositions tested were 6.0 g (grams) Resin A; 0.5 g water; 1.5 g of γ-butyrolactone and 0.75 g of magnesia hardener of different surface areas. The results are shown in Table 4. It can be seen from Table 4 that gel time is a function of magnesia surface area and

TABLE 2

Polymer Concrete Using Resin "A" Effect of Alkali and Ester

Mix: 36 g. Resin per 300 g. sand mixture
Diglyme or γ-Butyrolactone (25% B.O.R.)
Water (8.3% on resin)
Alkali source (magnesia or magnesium hydroxide hardener)
Epoxy Silane, 3-glycidoxypropyltrimethoxy silane, (1% on resin)

| | | | Compressive Strength, psi (Average of 3) 3 Days R.T. Dry + 4 Days Wet Immersion | | |
|---|---|---|---|---|---|
| Mix | 3 Days R.T. Dry | 7 Days R.T. Dry | H2O/ R.T | H2O/ 90° C. | 10% Acetic Acid R.T |
| 1. Diglyme$^{(a)}$ (25% on resin) Lightburned Magnesia of 65 m$^2$/g (12.5% on resin) | 437 | 777 | 669 | 3423 | 611 |
| 2. γ-Butyrolactone (25% on resin) Lightburned Magnesia of 65 m$^2$/g (12.5% on resin) | 2962 | 3704 | 3546 | 4893 | 3934 |
| 3. γ-Butyrolactone (25% on resin) Magnesium Hydroxide (18% on resin)$^{(b)}$ | 587 | 1628 | 1601 | 3245 | 1628 |

$^{(a)}$Diglyme = (2-methoxyethyl)ether, inert solvent
$^{(b)}$Equivalent to 12.5% Lightburned Magnesia Oxide

Effect of Additives on Compressive Strength Using γ-Butyrolactone (Ester) With Magnesium Hydroxide as Alkali Hardener

| Additive (% on Resin) | 24 Hr. R.T. Comp. Str., psi (average of 3) |
|---|---|
| None | 167 |
| NH$_4$Cl (2% B.O.R.) | 214 |
| NH$_4$F (2% B.O.R.) | 47 |

TABLE 3

Polymer Concrete Using Resin A - Effect of Additives on Compressive Strength

Mix: Resin A (36 g per 300 g sands)
γ-Butyrolactone (25% B.O.R.)
Magchem 50 (12.5% B.O.R.) (MgO)
Water (8.3% B.O.R.)
Epoxy silane, namely, 3-glycidoxypropyl-trimethoxy silane (1% B.O.R.)

Aggregate:
Mixture of 3 sands:
198 g coarse
72 g medium
30 g fine

| Additive (% on resin) | Room Temp. Comp. Str., psi (average of 3) | |
|---|---|---|
| | 8 Hrs. Hardening | 24 Hrs. Hardening |
| None (control) | 477 | |
| NaF (at 2% B.O.R.) | 168 | |
| Sodium Sulfamate (at 2% on Resin) | 393 | |
| Control | | 1390 |
| NaF (at 2% B.O.R.) | | 1103 |
| Sodium Sulfamate (at 1% B.O.R.) | | 1110 |
| Control | | 1353 |
| Li$_2$CO$_3$ (at 2% B.O.R.) | | 1781 |
| LiF (at 2% B.O.R.) | | 1315 |
| Calcium Formate (at 2% B.O.R.) | | 1520 |

In addition to the above Table 3, deadburned pulverized periclase was used by substituting about 18% of the periclase in place of the 12.5% Magchem 50 in the mix of Table 3. Without a retarder, the mix with periclase showed a 24-hour compressive strength, psi of 105, and with a 2% addition of ammonium fluoride, the mix remained soft after 5 days at room temperature. The periclase was 98.1% MgO on an ignited basis with a bulk specific gravity of 3.28 having 95% passing through a 50 U.S. Sieve Series screen and 75% passing a 200 U.S. Sieve Series screen.

concentration with the higher surface areas or concentrations decreasing the gel time.

TABLE 4

Effect of Magnesia on Gel Time of Resole-Ester-Magnesia Hardener

System:
6.0 g Resin A   1.5 g γ-Butyrolactone
0.5 g water    0.75 g (grams) Lightburned Magnesia (MgO)

| Mix | Surface Area of MgO, m²/g (square meters per gram) | Gel Time, Min. at 25° C. |
|---|---|---|
| 1 | 100 | 26 |
| 2 | 65 | 50 |
| 3[a] | 65 | 99 |
| 4 | 25 | 119 |

[a] ½ quantity of MgO used.

EXAMPLE 5

This example was performed to show the effect of additives which were previously shown to be accelerators or retarders at the 25° C. room temperature (R.T.) hardening on the solubilization of magnesium in the reaction mixture. The example was run in accordance with the "Procedure For Determination of Soluble Magnesium From Reaction Of Resin A & Magnesia With/Without Ester Hardener And With/Without Additive" which is set forth hereinabove. The results are shown in Table 5. The percentage readings of B.O.R. following the additive are percentages of the additive based on resin weight (B.O.R.). It can be seen from Table 5 that chloride increases magnesium solubilization and fluoride decreases solubilization in the reaction mixture. A similar effect is seen without ester in mixes 4–6 wherein the ester is replaced by inert solvent 2-methoxyethyl ether.

TABLE 5

Effect of Additives on Solubilization of Magnesium

System:
Resin A                                6.0 g
γ-Butyrolactone (or inert solvent)     1.5 g
Water                                  0.5 g
Lightburned Magnesia (65 m²/g)         0.75 g

| Mix[a] | Additive (% on Resin) | % Soluble Magnesium Reaction Time, Min. | | |
|---|---|---|---|---|
| | | 1 | 12 | 60 |
| 1 | None | 0.48 | 0.80 | 1.60 (50 min) |
| 2 | Sodium chloride (2% B.O.R.) | 0.53 | 0.97 | — |
| 3 | Ammonium fluoride (0.17% B.O.R.) | 0.26 | 0.53 | 0.69 |
| 4 | None | 0.43 | 0.76 | — |
| 5 | Sodium chloride (2% B.O.R.) | 0.52 | 0.91 | — |
| 6 | Ammonium fluoride (0.17% B.O.R.) | 0.20 | 0.34 | — |
| 7[b] | None | 0.0015 | — | — |
| 8 | Citric Acid (2% B.O.R.) | 0.16 | 0.31 | |
| 9 | Tetraethoxy Silane (2% B.O.R.) | 0.47 | 0.72 | |
| 10[c] | Tetraethoxy Silane (2% B.O.R.) | 0.43 | 0.69 | |
| 11[d] | Silbond 40 | 0.54 | 0.90 | 1.25 (after 15 min.) |
| 12 | N,N,N¹,N¹-Tetramethyl-1,3-propanediamine (2% B.O.R.) | 0.64 | 1.05 | |

[a] Mixes 1–3, 7–12 use γ-butyrolactone
Mixes 4–6 use inert solvent 2-methoxyethyl ether
[b] No resin is present; but proportionate amounts of water, alcohols, D.M.F. in resin are present.
[c] Delayed addition of ester and magnesia by five minutes.
[d] Delayed addition of ester and magnesia by 30 minutes.

EXAMPLE 6

Tests were performed to show the effect on gel time of various additives with certain esters. The gel time tests were run in accordance with the procedure set forth hereinbefore entitled "Procedure For Gel Determination." The test results set forth in Table 6 show accelerator or retarder activity of various additives at different temperatures and with different esters and resins.

TABLE 6

Effect of Additives on Gel Time of Resole-Ester-Magnesia Hardener

| Mix[a] | Resin | Ester | Additive (2% on Undiluted Resin) | Temp °C. | Gel Time, Minutes |
|---|---|---|---|---|---|
| 1 | A | γ-Butyrolactone | None | 60 | 7 |
| 2 | A | γ-Butyrolactone | Sodium fluoride | 60 | 21 |
| 3 | A | γ-Butyrolactone | Monosodium phosphate | 60 | 13 |
| 4 | A | Methyl lactate | None | 25 | 92 |
| 5 | A | Methyl lactate | Ammonium chloride | 25 | 22 |
| 6 | B | γ-Butyrolactone | None | 25 | 48 |
| 7 | B | γ-Butyrolactone | Ammonium chloride | 25 | 19 |
| 8 | B | γ-Butyrolactone | Ammonium fluoride | 25 | 267 |
| 9 | B | γ-Butyrolactone | None | 25 | 52 |
| 10 | B | γ-Butyrolactone | Sodium sulfate | 25 | 12 |
| 11 | A | Propylene carbonate | None | 25 | 23 |
| 12 | A | Dimethyl succinate | None | 25 | 71 |
| 13 | A | Dimethyl succinate | Lithium chloride | 25 | 13 |

[a] 6.0 g resin, 0.5 g water 1.5 γ-butyrolactone, 0.75 g lightburned magnesia (65 m²/g surface area) for Mixes 1–3, 6–8. Additional 1.8 g water for Mixes 9–10 in relation to Mix 1. Replace γ-butyrolactone by 1.75 g methyl lactate for mixes 4–5 in relation to Mix 1. In mixes 11–13, used the indicated ester in place of γ-butyrolactone in relation to Mix 1.

EXAMPLE 7

This example was performed to determine the effect of magnesia/lime ratios and additives on gel times of a resole and ester. The results of this example are shown in Table 7. It can be seen that in Resin A, up to 33% of MgO hardener can be replaced by CaO with substantially no effect on gel time (mixes 1–4) but a problem results at a 1:1 ratio (mix 5). In contrast, Resin C (lower molecular weight and higher free phenol) cannot tolerate even a 20% replacement of MgO with CaO without significantly adversely affecting gel time (Mix 10 versus control Mix 8). These results run counter to the Gupta U.S. Pat. No. 4,794,051 patent cited earlier herein in Col 4, lines 45–53 and 34–37, it is stated that magnesium oxide or hydroxide is too slow a hardening agent and that it is preferable to use a mixture of calcium and magnesium alkalis at a ratio of 10:1 to 0.1 to 10. Furthermore, it should be pointed out that the Gupta compositions remain thermoplastic "at about 20° C. to 70° C. for 24 to 100 hours or longer" (Col. 60, line 23 of Gupta) whereas the mixtures of phenolic resole resin and hardener or hardeners of this invention without retarder, harden in less than 24 hours.

EXAMPLES 9

This example was performed to show the effect of additives on gel times of Resin E which is a highly alkaline phenolic resole resin having a pH of about 13. The compositions of this example did not contain a magnesium hardening agent. The results of this example are shown in Table 9. Normally, with Resin E, the ethyl lactate induces hardening of the resin as shown by the gelation of Mix 1. However, all of the additives, including the chloride, which is an accelerator with the magnesium hardeners, acted as retarders or had no effect.

TABLE 7

Effect of Magnesia Hardener Lime Ratio and Additives On Gel Time of Resole-Ester

| Mix[a] | Resin | Alkali[b] | Temp °C. | Gel Time, Minutes | Additive (2% on Resin) |
|---|---|---|---|---|---|
| 1 | A | MgO | 25 | 48 | — |
| 2 | A | 4:1 MgO/CaO | 25 | 49 | — |
| 3 | A | 3:1 MgO/CaO | 25 | 50 | — |
| 4 | A | 2:1 MgO/CaO | 25 | 52 | — |
| 5 | A | 1:1 MgO/CaO | 25 | Mix lumps, test not run | — |
| 6 | A | 2:1 MgO/CaO | 25 | 11 | $NH_4Cl$ |
| 7 | A | 2:1 MgO/CaO | 25 | 104 | $NH_4F$ |
| 8 | C | MgO | 60 | 54 | — |
| 9[b] | C | 2:1 MgO/CaO | 60 | 123 | — |
| 10[b] | C | 4:1 MgO/CaO | 60 | 94 | — |
| 11 | C | MgO | 60 | 62 | Melamine |
| 12 | C | MgO | 60 | 79 | Aspartic acid |
| 13 | C | MgO | 60 | 28 | — |
| 14 | C | MgO | 60 | 42 | $NH_4F$ (0.15% on resin) |
| 15[c] | C | MgO | 60 | 47 | — |
| 16[c] | C | MgO | 60 | 63 | $NH_4F$ (0.15% on resin) |
| 17[c] | C | MgO | 60 | 115 | Tetraethoxysilane |
| 18[c] | C | MgO | 60 | 86 | Tetraethoxysilane (1.0% on resin) |

[a]For 6 g Resin A use 0.5 g water, 1.5 g γ-butyrolactone, 0.75 g alkali (lightburned MgO with surface area of 65 m²/g). For 8 g Resin C use 1.2 g γ-butyrolactone in Mixes 13-14, no ester in mixes 8-12 and 15-18, and 1.6 g alkali, namely the MgO, CaO or mixtures thereof in all mixes with Resin C.
[b]Mild exotherm upon addition of alkali, coalescing of particles observed.
[c]Resin stored at about 40° F. for several months.

EXAMPLE 8

This example was performed to show the effect of ester hardener on 100° C. (centigrade) gel time of Resin D with lightburned magnesia as the alkali. The results of this experiment are shown in Table 8. It can be seen from Table 8 that increased cure occurs by use of both ester and magnesium oxide (Mix 4, 60 min.) either of which is faster curing than resole without ester or MgO (Mix 1, 96 minutes). One percent of NaF, a strong retarder at room temperatures, shows little effect at 100° C. This is particularly significant because it allows for increased room temperature stability or open work time with little effect on thermal cure.

TABLE 8

Effect of Ester Hardener on 100° C. Gel Time of Resin D with Magnesia Hardener Alkali Having a Surface Area of 25 Square Meters per Gram (m²/g)

| Mix[a] | Ester Hardener | Gel Time, Min. |
|---|---|---|
| 1 | None (and no MgO) | 96 |
| 2 | None (but contains the MgO) | 80 |
| 3 | Dimethyl fumarate | 50 |
| 4 | Dimethyl adipate | 60 |
| 5[b] | Dimethyl adipate | 57 |
| 6[c] | Dimethyl adipate | 50 |
| 7 | DBE-9[d] | 53 |
| 8 | Dimethyl maleate | 55 |
| 9 | Hydroxyethyl methacrylate | 60 |
| 10[e] | Dimethyl adipate | 64 |

[a]8.4 g Resin D, 0.0081 ester equivalents hardener, 2-methoxyethyl ether (weight such that sum of ester hardener and ether equals a constant weight), 0.16 g MgO of 25 m²/g
[b]50% more MgO used
[c]50% more MgO and 50% more hardener used
[d]Mixed dimethyl ester of dibasic acids, predominantly dimethyl glutarate and dimethyl succinate sold by DuPont Chemical Company
[e]1% sodium fluoride (B.O.R.) used

TABLE 9

Effect of Additives on Gel Time OF Resin E with Ester Hardener (Resin E = Alphaset 9000 of Borden Chemical Co.)

| Mix | Additive 2% on Resin | Ester | Gel Time (25° C./Min) |
|---|---|---|---|
| 1 | None | Ethyl Lactate | 46 |
| 2 | Sodium chloride | Ethyl Lactate | 49 |
| 3 | Sodium sulfate | Ethyl Lactate | 49 |
| 4 | None | Triacetin | 11 |
| 5 | Ammonium chloride | Triacetin | 13 |
| 6 | Ammonium bifluoride | Triacetin | 13 |
| 7 | Ammonium sulfamate | Triacetin | 13 |
| 8 | Sodium phosphate monobasic | Triacetin | 16 |
| 9 | Sodium fluoride | Triacetin | 13 |
| 10 | Sodium sulfite | Triacetin | 15 |
| 11 | Formic acid (1.5% B.O.R.)[a] | Triacetin | 13 |

[a]Acid equivalent to 2% sodium phosphate monobasic.

EXAMPLE 10

This example was performed to show the effect of a retarder on the tensile strength of a refractory brick composition. Tests were run on the same composition without a retarder (Mix 1 and Mix 5) and with retarder (Mix 2) at different time periods at room temperature after mixing of the refractory composition and before pressing into tensile specimens, thermal cure, and eventual testing for tensile strength. The magnesium hardener (MgO) was lightburned magnesia having a surface area of 25 square meters per gram. The quantity of MgO used was 10% based on resin weight. Similar tests were performed by use of the refractory composition: without hardeners or retarder (Mix 3); and the magnesium hardener only (Mix 4). Mixes 1 and 5 were the same but run at different times.

The results of this example are shown in Table 10 which shows that Mix 2 containing the sodium fluoride retarder had better tensile strengths, particularly after the compositions were allowed to stand for 24 or 48 hours before pressing into test specimens. Omission of the hardener in Mix 4 and omission of both ester and magnesium hardener in Mix 3 gave poorer performance than Mix 1, Mix 2, or Mix 5.

The refractory composition for this example was prepared by intimately admixing: 1,275 g refractory magnesia (14/48 sieve size); 225 g refractory magnesia powder (to pass 200 sieve); 150 g graphite powder; 30 g atomized aluminum powder; and 70 g of Resin C. As appropriate, 7 g of lightburned magnesium oxide having a surface area of 25 square meters per gram and/or 7 g of DBE-9 ester (mixed dimethyl ester of dibasic acids, predominantly dimethyl glutarate and dimethyl succinate sold by DuPont Chemical Company) was also mixed in the refractory composition. A 150 g sample of the appropriate mix (at 0, 24, and 48 hours after preparation) was charged to a dogbone die which was then subjected to a ramming pressure of 15 tons for 1 minute to produce a tensile strength specimen. The specimens, 3 inches long, 1 inch thick, and 1 inch wide at the neck, were subjected to a thermal treatment of 110° C. for 2 hours followed by 1 hour at 180° C. These speciments were allowed to cool to room temperature prior to breaking. Unpressed mix was stored at 72° F.+/−2° F. and 51%+/−2% humidity.

TABLE 10

Effect of Magnesia Hardener and Retarder on Mix Life and Strength Using Resin C And Refractory Magnesia Aggregate

| Mix | | Tensile Strength, psi (2 hrs./110° C. + 1 hr./ 180° C. Cure) Unpressed R.T. Mix Age, hrs. | | |
|---|---|---|---|---|
| | | 0 | 24 | 48 |
| 1 | Resin C and DBE-9 MgO Hardener | 747 | 673 | 572 |
| 2 | Above + retarder (2% NaF B.O.R.) | 835 | 815 | 805 |
| 3 | Resin C only | | 582 | |
| 4 | Resin C and MgO Hardener | | 448 | |
| 5 | Resin C, DBE-9 and MgO Hardener | | 710 | |

EXAMPLE 11

In this example, the effect on flow of a polymer concrete composition was determined, with and without a retarder. The composition and its method of preparation for the control sample is that set forth in the hereinbefore described procedure entitled "Preparation And Testing Of Polymer Concrete For Compressive Strength," except that the sequence for adding the magnesia hardener and ester hardener were reversed. The composition and method of preparation of the test sample was the same as the control, except that 0.25% of ammonium bifluoride based on the weight of resin was added at the same time as the magnesia. After mixing, each sample was allowed to stand for five minutes before flow measurements were made in accordance with the hereinbefore described procedure entitled "Flow Determination Of Resin/Hardener/Magnesia/Aggregate Mix." The flow measurements showed that the control had a 37% flow whereas the sample containing the retarder had a flow of 60%.

EXAMPLE 12

In this example, tests were made to determine the amount of flow for a refractory castable composition with and without a retarder. The control composition was prepared by mixing the following ingredients for four minutes with a large stainless steel spatula: (a) a 35 g portion of a solution prepared by mixing: 29.4 g of Resin C, 9.8 g water and 4.4 g of $\gamma$-butyrolactone; with (b) a premixed batch of ingredients containing 66.5 g of deadburned magnesia having a U.S. Sieve size of $5 \times 8$ mesh, 66.5 g of deadburned magnesia having a sieve size of $8 \times 18$ mesh, 66.5 g of deadburned magnesia having a sieve size of $18 \times 40$ mesh, 66.5 g of deadburned magnesia retained on a 40 mesh sieve, and 84 g of pulverized deadburned magnesia with 75% thereof passing a 325 mesh screen; 7.0 g of atomized aluminum powder; and 7.0 g lightburned magnesia having a surface area of 65 square meters per gram 65 m$^2$/g). For the test sample, 0.1% of ammonium bifluoride based on the weight of the resin was added together with the ingredients and quantities set forth above for the control before the four-minute mixing. The flow is measured in accordance with the hereinbefore described procedure entitled "Flow Determination of Resin/Hardener/Magnesia/Aggregate Mix." The test results showed that the initial percent flow for the control (composition without retarder) was 50% and the initial percent flow for the test sample containing the retarder was 60%. Upon standing for five minutes after the mixing step, the control had a flow of 40%, whereas the test sample containing the retarder had a flow of 50%. It can be seen that the retarder provides a higher initial flow of the composition and maintains a higher flow after five minutes.

EXAMPLE 13

This example was performed to determine the effect on viscosity and gelation, with and without a retarder, for a formulation of resin, ester, and magnesium hardener which could be used as part of a coated abrasives formulation. The formulation for the control composition was a mixture of: 20 g of Resin D; 1.6 g of DBE-9 (8% based on resin weight); and 0.4 g of lightburned magnesium oxide having a surface area of 25 square meters per gram (2% based on resin weight). The test sample was a mixture of the same ingredients together with 0.06 g of 33% ammonium bifluoride (0.1% B.O.R.). The change in viscosity over various periods of time was recorded and is shown in Table 13. The results from Table 13 clearly show the benefit of a retarder to give R.T. (room temperature) stability. The figures in parenthesis in Table 13 show percent viscosity increase relative to zero hour.

TABLE 13

Effect of Retarder on Viscosity of Formulation Using Lightburned Magnesia Having Surface Area of 25 m2/g and Ester A. Change in Viscosity of Formulation Containing 0.1% NH$_4$HF$_2$ Retarder (B.O.R.)

| Time in Hours | 0 | 3 | 4.5 | 7 | 24 |
|---|---|---|---|---|---|
| Gardner-Holt Tube Readings at 25° C. | Y$\frac{1}{4}$ | Y$\frac{1}{2}$ | Y$\frac{3}{4}$ | Z$\frac{1}{4}$ | Z5$\frac{3}{4}$ |
| Centistokes | 1,930 | 1,930 | 2,142 (11) | 2,378 (23) | 12,900 |

TABLE 13-continued

Effect of Retarder on Viscosity of Formulation Using Lightburned Magnesia Having Surface Area of 25 m2/g and Ester B. Change in Viscosity of Formulation Without the Retarder

| Time in Hours | 0 | 1.5 | 2.5 | 3.5 | 4.5 | 5.5 |
|---|---|---|---|---|---|---|
| Gardner-Holt Tube Readings at 25° C. | Y | Y | Y½ | Y¾ | Z | Z1 |
| Centistokes | 1,760 | 17.60 | 2,015 (14) | 2,142 | 2,270 (29) | 2,700 (53) |

EXAMPLE 14

This example was performed to show the effect of using a mixture of lightburned magnesium oxide hardeners of different surface areas. To a solution of 8.0 g Resin A, 0.67 g water, and 2.0 g gama butyrolactone, there was added 1.0 g lightburned magnesia having a surface area of 65 m2/g. The mixture was strongly agitated for 1 minute and then 5.0 g of the mixture was transferred to each of two small cylindrical plastic vials (22 mm wide) and capped and allowed to stand at 72° F.+/−2° F. for 4 days. The hardened mass was removed from the vials and weighed. The hardened masses were designated as cylinders No. 1 and No. 2. These were then heated for 2 hours at 105° C., weighed and then heated for another 2 hours 135° C. and reweighed. A similar procedure was followed as above except that an additional 1.0 g of lightburned magnesia having a surface area of 10 square meters per gram was added to the same quantity of the various ingredients used to prepare cylinders No. 1 and No. 2 for a total magnesia of 2.0 g per 8 g of Resin A and the samples designated as cylinders No. 3 and No. 4. The results are shown in Table 14 wherein the compressive failure was measured on a Tinius Olsen tensile test machine. It can be seen from Table 14 that samples with additional magnesia lose less weight and have higher crush strengths than samples with 50% less magnesia. The effect on gel time was minimal, as can be seen in Table 1, Mix 1, in that the mixture of magnesias had a gel time of 62 minutes for samples No. 3 and No. 4 as compared to 67 minutes for the samples No. 1 and No. 2. Following the same procedure as in this example, various retarders such as ammonium fluoride, sodium bifluoride, tetraethoxy silane, and aspartic acid can be added to such compositions containing mixed surface area magnesium to obtain higher strength while extending the gel time in binder, raw batch, and other compositions of this invention. One of the tests in Mix 2 of Table 1 shows such extension of gel time.

TABLE 14

Effect of a Mixture of Lightburned Magnesium Oxides Having Different Surface Areas in Binder Compositions Weight in Grams

| Cylinder | Unheated | 2 Hours at 105° C. | 2 Hours at 135° C. | Pounds To Compressive Failure |
|---|---|---|---|---|
| 1 | 4.99 | 4.79 | 4.65 | 2755 |
| 2 | 4.98 | 4.79 | 4.65 | 2855 |
| 3 | 4.98 | 4.85 | 4.77 | 3495 |
| 4 | 4.96 | 4.83 | 4.75 | 3545 |

EXAMPLE 15

This example was performed to show the effect of using an air detraining agent on a polymer concrete composition prepared from silica sand aggregate, Resin A, gamma-butyrolactone, lightburned magnesium oxide having a surface area of 65 m2/g and ammonium bifluoride retarder. Compressive strength specimens were prepared in accordance with the hereinbefore described procedure entitled "Procedure For The Preparation And Testing of Polymer Concrete For Compressive Strength" and tensile specimens were prepared in accordance with the hereinbefore described procedure entitled "Procedure For The Preparation and Testing of Polymer Concrete For Tensile Strength" except that a smaller mix was used and mixing was done manually.

Polymer concretes were prepared with and without SAG-10, a silicone antifoam agent as the detraining agent. SAG-10 is a 10% dimethylpolysiloxane emulsion which is marketed by Union Carbide Corporation. The sand aggregate used in this example was a mixture of three different sands consisting of 198 parts of coarse sand, 72 parts of medium sand, and 30 parts of fine sand. Enhancement of strength by the use of SAG-10 is clearly shown by the results of Table 15.

Air detraining agents such as antifoamers, e.g., dimethylpolysiloxane and the like, can be employed in an amount sufficient to increase the strength of the composition. Such quantities can vary over a broad range such as from about 0.005% to 0.1% based on the weight of resin and preferably from about 0.01% to 0.05% based on the weight of resin.

TABLE 15

The Effect of Air Detraining On Polymer Concrete Strengths Using Resin A and Butyrolactone and Lightburned Magnesia as Hardener The Mix
Sands Aggregate
Resin A (36 g per 300 g sands)
Gamma-Butyrolactone (25% B.O.R.)
Water (8.3% B.O.R.)
Ammonium Bifluoride (0.1% B.O.R.)
3-Glycidoxypropyl Trimethoxysilane (1% B.O.R.)
SAG 10[a]
Magchem 50 (12.5% B.O.R.) (MgO)

| Additive (% on resin) | (Average of 3) Compressive Strength, psi | | Tensile Strength, psi (Average of 3) | |
|---|---|---|---|---|
| | 1 Day R.T. | 1 Day R.T. + 2 Hrs. at 100° C. | 1 Day R.T. | 1 Day R.T. + 2 Hrs. at 100° C. |
| None | 657 | 4937 | 158 | 1272 |
| SAG 10[a] | 1075 | 6338 | 233 | 1493 |

[a]A 10% dimethylpolysiloxane emulsion (Union Carbide Corp.) used at 0.2% B.O.R. for compressive strength specimens and at 0.1% B.O.R. for tensile strength specimens.

What is claimed is:
1. A method for making a raw batch composition which comprises mixing:
 a. an aggregate material;
 b. a sufficient quantity of a hardenable phenolic resole resin to bind said aggregate on hardening;
 c. a magnesium hardening agent selected from the group consisting of magnesium hydroxide and lighturned magnesium oxide having a surface area of at least 10 square meters per gram in a quantity sufficient to increase the rate of hardening of said resin; and
 d. a compound which decreases the solubility of magnesium in said composition, said compound being one which increases the time required to gel the composition at 25° C. by at least 35% when tested by mixing the resin with 2% of said compound, 12.5% of lightburned magnesium oxide having a surface area of 65 square meters per gram, 25% of gamma-butyrolactone, and 8.33% water, the percentages of compound, oxide, gamma-butyrolactone and water based on the weight of resin.

2. The method of claim 1 wherein the aggregate is in particulate form and the hardening agent is lightburned magnesium oxide having a surface area of at least 10 square meters per gram and the resin is phenol formaldehyde.

3. The method of claim 2 wherein the magnesium oxide has a surface area of from about 25 to 65 square meters per gram.

4. The method of claim 2 wherein:
 a. the phenolic resole resin is phenol-formaldehyde having a pH of about 4.5 to 9.5, a viscosity of about 100 to 4,000 cps at 25° C., and a solids content of about 50% to 90% based on the weight of resin;
 b. the magnesium hardening agent is lightburned magnesium oxide having a surface area of at least 10 square meters per gram in a quantity of about 2% to 40% by weight of the resin; and
 c. the said compound is in a quantity of from about 0.1% to 5% by weight of the resin and said compound is a member selected from the group consisting of: a compound which provides a fluoride, bifluoride, citrate, tartrate, aspartate, oxalate, phosphate, glutamate, malate, iminodiacetate, iminodipropionate, aminoacetate, aminopropionate, aminobenzoate anion; or a tetraalkoxy silane having from 1 to 3 carbon atoms in each alkoxy group; and a partially hydrolyzed tetraalkoxy silane having from 1 to 3 carbon atoms in each alkoxy group.

5. The method of claim 4 wherein the aggregate is a member selected from the group consisting of refractory grade magnesia, alumina, and silica and mixtures thereof.

6. The method of claim 4 wherein the mixture includes from about 5% to 40% by weight of the resin of an ester functional hardening agent.

7. The method of claim 6 wherein the mixture includes an organofunctional silane in an amount sufficient to improve adhesion between the resin and aggregate.

8. A composition prepared by hardening at ambient temperature the composition of claim 4.

9. A composition prepared by thermally curing the composition of claim 4.

10. A composition prepared by hardening at room temperature the composition of claim 6.

11. A composition prepared by thermally curing the composition of claim 6.

12. A method for making a monolithic refractory body which comprises:
 a. preparing a flowable liquid composition by mixing (1) an aggregate material, (2) a phenolic resole resin in a quantity sufficient to bind the aggregate, (3) lightburned magnesium oxide having a surface area of at least 10 square meters per gram in an amount sufficient to increase the rate of hardening of said resin, (4) an ester functional hardening agent in an amount sufficient to increase the rate of hardening of said composition, and (5) a retarder compound in an amount sufficient to decrease the solubility of magnesium in said composition and retard the hardening of said composition, said compound being one which increases the time required to gel the composition at 25° C. by at least 35% when mixed therein at a concentration of 2% based on the weight of resin;
 b. placing said flowable mixture into a mold;
 c. vibrating said mold to permit the mixture to take the shape of the mold; and
 d. permitting the mixture to harden at a temperature of about 60° F. to 120° F.

13. The method of claim 12 wherein the composition includes an additive selected from the group consisting of graphite, a metal powder, and mixtures thereof.

14. A monolithic refractory composition prepared by the method of claim 12.

15. A monolithic refractory body prepared by thermally curing the composition of claim 12.

16. The refractory of claim 15 wherein said composition includes an additive selected from the group consisting of graphite, a metal powder, and mixtures thereof.

17. The method of claim 12 wherein the retarder is a member selected from the group consisting of: a compound which provides a fluoride, bifluoride, citrate, tartrate, aspartate, oxalate, phosphate, glutamate, malate, iminodiacetate, iminodipropionate, aminoacetate, aminopropionate, aminobenzoate anion; or a tetraalkoxy silane having from 1 to 3 carbon atoms in each alkoxy group; and a partially hydrolyzed tetraalkoxy silane having from 1 to 3 carbon atoms in each alkoxy group.

18. The method of claim 12 wherein said compound provides a fluoride anion.

19. The method of claim 12 wherein said compound provides a bifluoride anion.

20. The method of claim 12 wherein said compound is a tetraalkoxy silane having from 1 to 3 carbon atoms in each alkoxy group.

21. The method of claim 12 wherein said compound is a partially hydrolyzed tetraalkoxy silane having from 1 to 3 carbon atoms in each alkoxy group.

22. A raw batch composition comprising:
 A. an aggregate material;
 B. a hardenable phenolic resole resin having a pH of about 4.5 to 9.5 in a quantity sufficient to bind the aggregate on hardening;
 C. about 2% to 35% based on the weight of resin of lightburned magnesium oxide having a surface area of at least 10 square meters per gram; and
 D. about 0.05% to 5% by weight based on the weight of the resin of a compound selected from the group consisting of: a compound which provides a fluoride, bifluoride, citrate, tartrate, aspartate, oxalate, phosphate, glutamate, malate, iminodiacetate, iminodipropionate, aminoacetate, aminopropionate, aminobenzoate anion; or a tetraalkoxy silane having from 1 to 3 carbon atoms in each alkoxy group; and a partially hydrolyzed tetraalkoxy silane having from 1 to 3 carbon atoms in each alkoxy group.

23. The composition of claim 22 which includes from about 5% to 40% based on the quantity of resin of an ester functional hardening agent selected from the group consisting of a lactone, a cyclic organic carbonate, a carboxylic acid ester and mixtures thereof.

24. The composition of claim 23 wherein the compound is tetraalkoxysilane or partially hydrolyzed tetraalkoxy silane.

25. The composition of claim 23 wherein the compound provides fluoride or bifluoride anions.

* * * * *